(12) United States Patent
Park et al.

(10) Patent No.: US 10,097,761 B2
(45) Date of Patent: Oct. 9, 2018

(54) METHOD OF MANAGING DATA AND ELECTRONIC DEVICE FOR PROCESSING THE SAME

(71) Applicant: Samsung Electronics Co., Ltd., Suwon-si, Gyeonggi-do (KR)

(72) Inventors: Joon-Won Park, Yongin-si (KR); Sung-Wang Kim, Seoul (KR); Young-Seong Kim, Seoul (KR); Yeo-Jin Moon, Seoul (KR); Yun-Hong Choi, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/734,485

(22) Filed: Jun. 9, 2015

(65) Prior Publication Data
US 2015/0381896 A1 Dec. 31, 2015

(30) Foreign Application Priority Data
Jun. 26, 2014 (KR) .................. 10-2014-0078814

(51) Int. Cl.
*H04N 5/232* (2006.01)
*H04N 5/77* (2006.01)

(52) U.S. Cl.
CPC ..... *H04N 5/23293* (2013.01); *H04N 5/23216* (2013.01); *H04N 5/772* (2013.01)

(58) Field of Classification Search
CPC .. G06F 3/0481; G06F 3/0482; H04N 5/23216
USPC .......................... 715/700, 810, 864
See application file for complete search history.

(56) References Cited

U.S. PATENT DOCUMENTS

| 6,957,397 B1* | 10/2005 | Hawkins | G06F 3/0482 715/810 |
| 8,745,500 B1* | 6/2014 | Kostello | G11B 27/031 386/282 |
| 9,571,755 B2* | 2/2017 | Jang | H04N 21/8146 |
| 2003/0137495 A1* | 7/2003 | Canova, Jr. | G06F 1/1626 345/173 |
| 2005/0253867 A1 | 11/2005 | Inakura | |
| 2010/0229122 A1 | 9/2010 | McCormack et al. | |
| 2012/0078737 A1* | 3/2012 | Kulakowski | G06Q 20/20 705/16 |
| 2012/0081556 A1* | 4/2012 | Hwang | H04N 1/00411 348/207.1 |

(Continued)

FOREIGN PATENT DOCUMENTS

| CN | 103299262 A | 9/2013 | |
| KR | 20040066377 | * 7/2004 | G06F 17/00 |

(Continued)

*Primary Examiner* — Mishawn Hunter
(74) *Attorney, Agent, or Firm* — Jefferson IP Law, LLP

(57) ABSTRACT

An electronic device and a method for generating or storing data are provided. A method of operating an electronic device includes outputting a first application execution screen in a first reproduction area in response to an application execution request, outputting a second reproduction area for generating a command related to recording data generation in at least a part of the first reproduction area, outputting a second application execution screen in the second reproduction area, and generating recording data in response to an input for the second reproduction area.

14 Claims, 21 Drawing Sheets

(56) References Cited

U.S. PATENT DOCUMENTS

| | | | |
|---|---|---|---|
| 2013/0147849 A1* | 6/2013 | Kwak | G09G 5/14 345/666 |
| 2013/0157697 A1* | 6/2013 | Kang | H04W 4/02 455/457 |
| 2013/0179816 A1* | 7/2013 | Seo | G06F 3/04842 715/770 |
| 2013/0254694 A1* | 9/2013 | Lee | H04N 21/47815 715/769 |
| 2014/0125757 A1 | 5/2014 | Lee et al. | |
| 2014/0173516 A1* | 6/2014 | Hwang | G06F 3/04842 715/821 |
| 2014/0229888 A1* | 8/2014 | Ko | G06F 3/04842 715/783 |
| 2014/0237420 A1* | 8/2014 | Song | G06F 3/04845 715/790 |
| 2014/0280561 A1* | 9/2014 | Dubois | G06Q 50/00 709/204 |
| 2015/0138046 A1* | 5/2015 | Moon | G06F 3/0416 345/7 |
| 2015/0213632 A1* | 7/2015 | Trask | G06T 11/60 715/234 |

FOREIGN PATENT DOCUMENTS

| | | |
|---|---|---|
| WO | 2005/09123 A1 | 9/2005 |
| WO | 2010/070193 A1 | 6/2010 |
| WO | 2012/128795 A1 | 9/2012 |

\* cited by examiner

METHOD OF MANAGING DATA AND ELECTRONIC DEVICE FOR PROCESSING THE SAME

CROSS-REFERENCE TO RELATED APPLICATION(S)

This application claims the benefit under 35 U.S.C. § 119(a) of a Korean patent application filed on Jun. 26, 2014 in the Korean Intellectual Property Office and assigned Serial No. 10-2014-0078814, the entire disclosure of which is hereby incorporated by reference.

TECHNICAL FIELD

The present disclosure relates to an electronic device and a method for generating or storing data.

BACKGROUND

Recently, the number of electronic devices, such as "smart phones," that are able to complexly perform one or more functions is gradually increasing. In this regard, a mobile terminal is equipped with a display module having a large touch type screen and has a high pixel camera module to photograph a still image and a video, as well as basic functions such as the ability to communicate with a counterpart mobile terminal. Further, the mobile terminal may reproduce multimedia contents such as music and videos, and also perform web surfing by accessing a network. The mobile terminal as described above has a continuously evolving high performance processor and thus can perform various functions.

Recent electronic devices may generate or store various types of data. For example, the electronic device may generate image data by using a camera function and store the generated image data.

The above information is presented as background information only to assist with an understanding of the present disclosure. No determination has been made, and no assertion is made, as to whether any of the above might be applicable as prior art with regard to the present disclosure.

SUMMARY

According to the related art, an electronic device may generate data by using a separate menu.

For example, the electronic device may output a menu for generating data in a part of a screen, and generate the data according to detection of an input of the output menu. However, the output menu occupies the part of the screen and thus hides the part of an output screen composition, which causes inconvenience of the use of the electronic device.

Aspects of the present disclosure are to address at least the above-mentioned problems and/or disadvantages and to provide at least the advantages described below. Accordingly, an aspect of the present disclosure is to provide an apparatus and a method for addressing the problem that the composition output on the screen is hidden by the menu for generating the data.

Another aspect of the present disclosure is to provide an apparatus and a method for providing a data reproduction screen of the electronic device through an interface for generating a command for data generation.

Another aspect of the present disclosure is to provide an apparatus and a method for controlling the type of a data reproduction screen for generating a command for data generation in response to an input.

In accordance with an aspect of the present disclosure, an electronic device is provided. The electronic device includes a data acquisition module configured to acquire a first image and a second image to generate recording data, a display module configure to output the first image in a first reproduction area, output the second image in a second reproduction area, and provide at least one of the reproduction areas as an interface for generating a command for recording data generation, and a generation module configured to generate recording data by using one or more of the images output in the first reproduction area and the second reproduction area in response to an input for the reproduction area provided as the interface.

In accordance with another aspect of the present disclosure, a method of operating an electronic device is provided. The method includes outputting a first application execution screen in a first reproduction area in response to an application execution request, outputting a second reproduction area for generating a command related to recording data generation in at least a part of the first reproduction area, outputting a second application execution screen in the second reproduction area, and generating recording data in response to an input for the second reproduction area.

In accordance with another aspect of the present disclosure, a computer-readable recording medium having a program recorded therein to execute a process is provided. The process includes outputting a first application execution screen in a first reproduction area in response to an application execution request, outputting a second reproduction area for generating a command related to recording data generation in at least a part of the first reproduction area, outputting a second application execution screen in the second reproduction area, and generating recording data in response to an input for the second reproduction area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
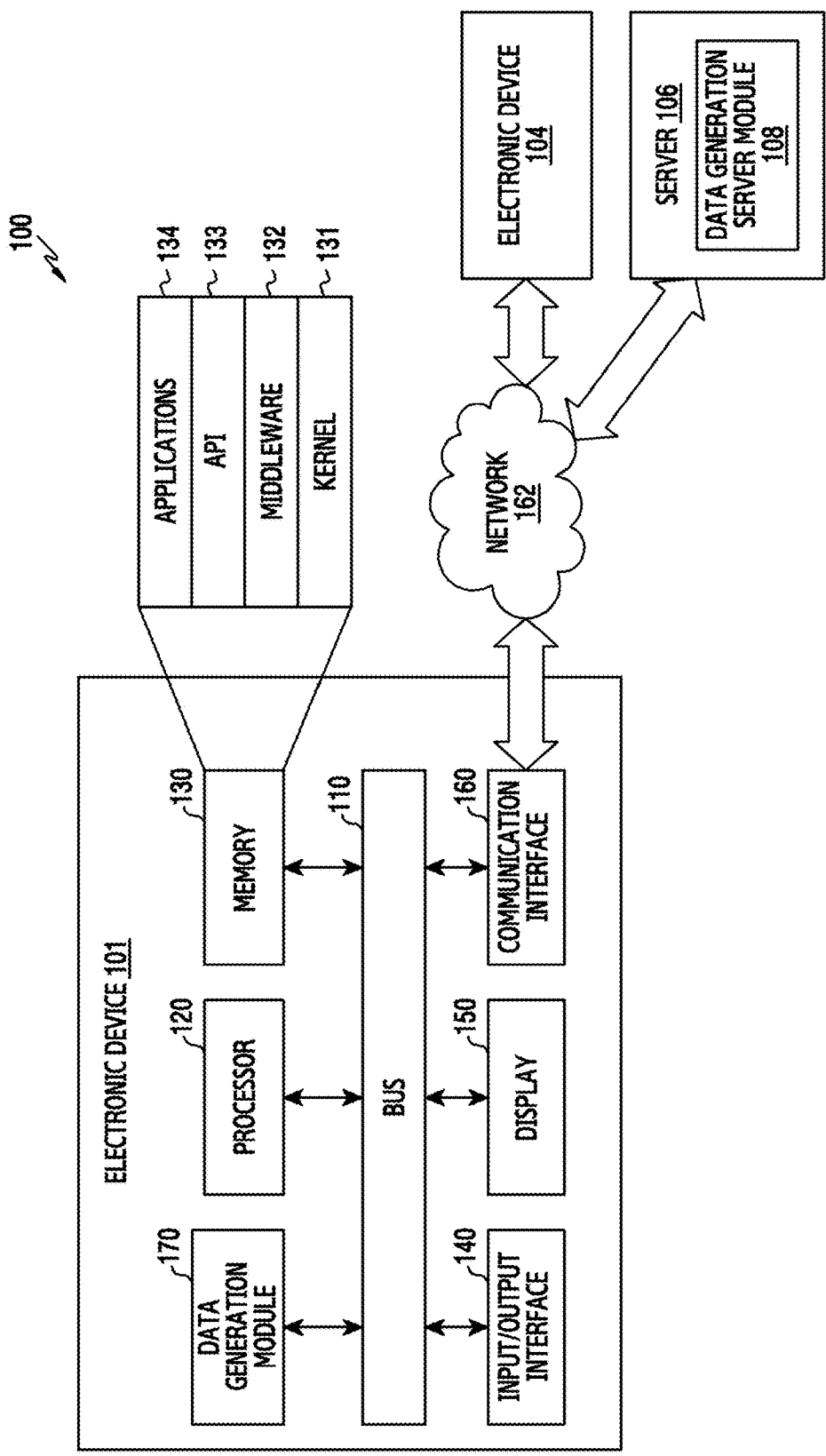
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "include" or "may include", etc. that may be used in the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A, may include B, or may include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disc (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain embodiments, an electronic device may include at least one of furniture or a portion of a building/structure including a communication function, an electronic board, an electronic signature receiving device, a projector, or various measurement devices (e.g., waterworks, electricity, gas, or radio wave measuring device, etc.). An electronic device according to embodiments of the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., an artificial intelligence electronic device) that uses the electronic device.

FIG. 1 is a view illustrating a network environment including an electronic device according to various embodiments of the present disclosure.

Referring to FIG. 1, the electronic device 101 of the network environment 100 may include a bus 110, a processor 120, a memory 130, an input/output (I/O) interface 140, a display 150, a communication interface 160, and a data generation module 170.

The bus 110 may be a circuit for connecting the above-described elements with each other, and transferring communication (e.g., a control message) between the above-described elements.

The processor 120 may receive, for example, an instruction from the above-described other elements (e.g., the memory 130, the I/O interface 140, the display 150, the communication interface 160, or the data generation module 170, etc.) via the bus 110, decipher the received instruction, and execute an operation or a data process corresponding to the deciphered instruction.

The memory 130 may store an instruction or data received from the processor 120 or other elements (e.g., the I/O interface 140, the display 150, the communication interface 160, or the data generation module 170, etc.), or generated by the processor 120 or other elements. The memory 130 may include, for example, programming modules such as a kernel 131, a middleware 132, an application programming interface (API) 133, or an application 134. The each of the programming modules may be configured using a software, a firmware, a hardware, or a combination of two or more of these.

The kernel 131 may control or manage system resources (e.g., the bus 110, the processor 120, or the memory 130, etc.) used for executing an operation or a function implemented in the rest of the programming modules, for example, the middleware 132, the API 133, or the application 134. Also, the kernel 131 may provide an interface for allowing the middleware 132, the API 133, or the application 134 to access an individual element of the electronic device 101 and control or manage the same.

The middleware 132 may perform a mediation role so that the API 133 or the application 134 may communicate with the kernel 131 to give and take data.

Also, in connection with task requests received from the applications 134, the middleware 132 may perform a control (e.g., scheduling or load balancing) for a task request using, for example, a method of assigning priority that may use a system resource (e.g., the bus 110, the processor 120, or the memory 130, etc.) of the electronic device 101 to at least one of the applications 134.

The API 133 is an interface for allowing the application 134 to control a function provided by the kernel 131 or the middleware 132, and may include at least one interface or function (e.g., an instruction) for file control, window control, image processing, or character control, etc.

According to various embodiments, the application 134 may include an SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 134 may be an application related to information exchange between the electronic device 101 and an external electronic device (e.g., an electronic device 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 104). Additionally or alternatively, the notification relay application may, for example, receive notification information from an external electronic device (e.g., the electronic device 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 104) communicating with the electronic device 101 and an application operating in the external electronic device or a service (e.g., a communication service or a message service) provided by the external electronic device.

According to various embodiments, the application 134 may include a designated application depending on an attribute (e.g., a kind of an electronic device) of the external electronic device (e.g., the electronic device 104). For example, in the case where the external electronic device is an MP3 player, the application 134 may include an application related to music reproduction. Similarly, in the case where the external electronic device is a mobile medical health care device, the application 134 may include an application related to health care. According to an embodiment, the application 134 may include at least one of an application designated in the electronic device 101 and an application received from the external electronic device (e.g., an server 106 or the electronic device 104).

The I/O interface 140 may transfer an instruction or data input from a user via an I/O unit (e.g., a sensor, a keyboard, or a touchscreen) to the processor 120, the memory 130, the communication interface 160, or the data generation module 170 via the bus 110, for example. For example, the I/O interface 140 may provide data regarding a user's touch input via the touchscreen to the processor 120. Also, the I/O interface 140 may, for example, output an instruction or data received via the bus 110 from the processor 120, the memory 130, and the communication interface 160, or the data generation module 170 via the I/O unit (e.g., a speaker or a display). For example, the I/O interface 140 may output voice data processed by the processor 120 to a user via a speaker.

The display 150 may display various information (e.g., multimedia data or text data, etc.) to a user.

The communication interface 160 may connect communication between the electronic device 101 with an external device (e.g., the electronic device 104 or the server 106). For example, the communication interface 160 may be connected with a network 162 via wireless communication or wired communication to communicate with the external device. The wireless communication may, for example, include at least one of Wireless Fidelity (Wi-Fi), Bluetooth (BT), Near Field Communication (NFC), GPS, or cellular communication (e.g., LTE, LTE-A, CDMA, WCDMA, UMTS, WiBro, or GSM, etc.). The wired communication may include, for example, at least one of Universal Serial Bus (USB), High Definition Multimedia Interface (HDMI), recommended standard 232 (RS-232), and plain old telephone service (POTS).

According to an embodiment, the network 162 may be a telecommunications network. The telecommunications network may include at least one of a computer network, the Internet, an Internet of things, and a telephone network. According to an embodiment, a protocol (e.g., a transport layer protocol, a data link layer protocol, or a physical layer protocol) for communication between the electronic device 101 and an external device may be supported by at least one of the application 134, the API 133, the middleware 132, the kernel 131, or the communication interface 160.

According to an embodiment of the present disclosure, the server 106 supports driving of the electronic device 101 by performing at least one operation among operations (or functions) implemented in the electronic device 101. For example, the server 106 may include a data generation server module 108 which can support the data generation module 170 implemented in the electronic device 101. For instance, the data generation server module 108 may include at least one constituent element of the data generation module 170, and perform (e.g., act for) at least one operation among operations performed by the data generation module 170.

The data generation module 170 may generate, for example, recording data related to a plurality of images output through the electronic device 101 according to an embodiment. According to various embodiments, the data generation module 170 may generate recording data by using a first recording image of a data reproduction screen, for example, an application execution screen, and a second recoding image acquired through a camera.

According to various embodiments, the data generation module 170 may provide at least one area in which the data reproduction screen is output and/or an area in which the image acquired through the camera is output through an interface for generating a command for the generation of the recording data. For example, the data generation module 170 may acquire a recording image or recording data in response to an input in the area in which the data reproduction screen or the image acquired through the camera is output.

According to various embodiments, the data generation module 170 may control the area in which the image acquired through the camera is output in response to the input. According to an embodiment, the data generation module 170 may change a position, a size, a shape, etc. of the area.

According to various embodiments, the data generation module 170 may reproduce the first recording image and the second recording image included in the recording data together when the recording data is reproduced.

Hereinafter, additional information on the data generation module 170 will be provided with reference to FIGS. 2 through 18.

Figure 2:
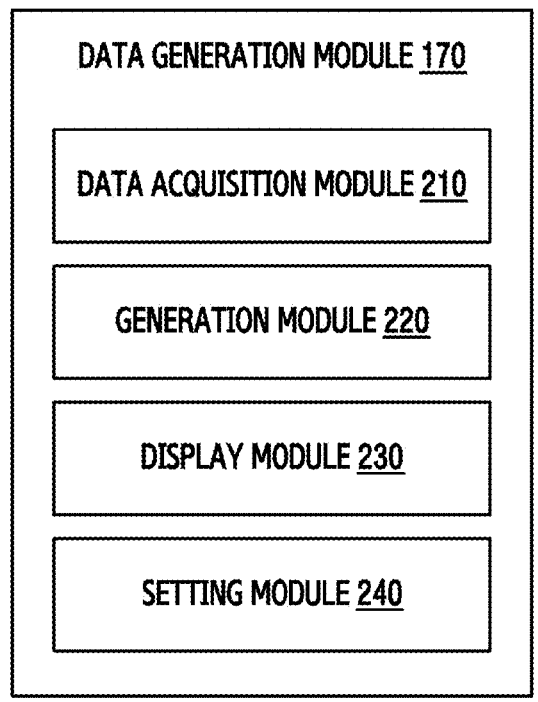
FIG. 2 illustrates a configuration of a data generation module according to various embodiments of the present disclosure.

FIG. 2 illustrates a configuration of a data generation module according to various embodiments of the present disclosure.

Referring to FIG. 2, the data generation module 170 may include a data acquisition module 210, a generation module 220, a display module 230, and a setting module 240.

The data acquisition module 210 may acquire one or more images to be included in the recording data. According to an embodiment, the recording data may be image data generated by recording an output screen (or image) of the electronic device. For example, the recording data may include a recording image of a first image (for example, a first recording image) and a recording image of a second image (for example, a second recording image).

According to various embodiments, the data acquisition module 210 may acquire a data reproduction screen, for example, an application execution screen output through the display of the electronic device as the first image. According to an embodiment, the data acquisition module 210 may acquire the first image related to a game application, a multimedia data reproduction application, a browser application, a document making application, a chatting application, etc.

According to various embodiments, the data acquisition module 210 may acquire the second image which may be output together with the first image. According to various embodiments, the data acquisition module 210 may include one or more image acquisition devices, for example, a camera module. For example, the data acquisition module 210 may acquire the second image, for example, a user side image by using a camera module located on a front portion of the electronic device. In another example, the data acquisition module 210 may acquire the second image, for example, a background image which the user watches by using a camera module located on a rear portion of the electronic device. In still another example, the data acquisition module 210 may use an image stored in the electronic device, another electronic device, and a server as the second image.

According to various embodiments, the first image and the second image may include a still image and a motion image. According to various embodiments, the data acquisition module 210 may acquire the second image in response to a key input, a voice command input, a gesture input, etc.

The generation module 220 may generate recording data by using images, for example, the first image and the second image acquired through the data acquisition module 210. According to various embodiments, the generation module 220 may generate recording data by using the first image and the second image.

According to various embodiments, the generation module 220 may generate recording data including a first recording image and a second recording image which are formed in one layer. For example, the generation module 220 may generate one recording data generated by combining one part of the first recording image with the second recording image.

According to various embodiments, the generation module 220 may generate recording data including a plurality of layers. According to an embodiment, the generation module 220 may generate recording data by using a plurality of images which are formed in one layer. For example, the generation module 220 may generate a second recording image, which includes a layer including a recording time, a layer including a recording notification icon, a layer including a recording generation date, and a layer including a second image. The recording data including the plurality of layers may be reproduced in a state where at least one layer is removed.

The display module 230 may output an operation associated with the generation of the recording data and an operation associated with the reproduction of the recording data.

According to various embodiments, in connection with the generation of the recording data, the display module 230 may output a first reproduction area and a second reproduction area. According to an embodiment, the display module 230 may output a first image (for example, an application execution screen) in the first reproduction area and output a second image (for example, an image acquired through the camera) in the second reproduction area. According to an embodiment, the display module 230 may arrange the second reproduction area in the part of the first reproduction area. According to an embodiment, the second reproduction area may be a screen floating on the first reproduction area. According to various embodiments, at least one of the first reproduction area and the second reproduction area may be an interface for generating a command for the generation of the recording data.

According to various embodiments, in connection with the operation for the reproduction of the recording data, the display module 230 may output a storage list of the recording data. For example, the display module 230 may output a list by using a reduced image of the first recording image, for example, a thumbnail image. In addition, the display module 230 may add information informing that the second recording image is included in the reduced image of the recording image.

According to various embodiments, the display module 230 may acquire a first recording image and a second recording image related to recording data selected in response to an input for selecting one or more pieces of recording data from the output list and may output the acquired first and second recording images. The display module 230 may output the first recording image and the second recording image which are reproduced together.

The setting module 240 may change a position, a size, a shape, etc. of the second reproduction area in response to an input. According to an embodiment, the input may be a drag input, and the setting module 240 may move the second reproduction area to a second position from a first position in response to the input. According to another embodiment, the input may be a long touch input, and the setting module 240 may enlarge or reduce a first size of the second reproduction area into a second size in response to the input. According to a still another embodiment, the input may be a flicking gesture, and the setting module 240 may move the second reproduction area to a second position from a first position in response to the gesture.

According to various embodiments, the setting module 240 may manage a size, a position, a shape, etc. of the second reproduction area of each application executed. For example, the setting module 240 may output a second reproduction area of the executed application corresponding to a predefined size and shape in a predefined position. In another example, the setting module 240 may maintain and output the position, the size, the shape, etc. of the second reproduction area of the executed application which has been output for the previous execution.

According to various embodiments, the electronic device may include a data acquisition module for acquiring a first image and a second image to generate recording data, a display module for outputting the first image in a first reproduction area, outputting the second image in a second reproduction area, and providing at least one of the reproduction areas as an interface for generating a command for recording data generation, and a generation module for generating recording data by using one or more of the images output in the first reproduction area and the second reproduction area in response to an input for the reproduction area provided as the interface.

According to various embodiments, the display module may output an application execution screen in the first reproduction area in response to execution of an application and output an image acquired through at least one of an image acquisition apparatus, another electronic device, a server, and a storage medium in the second reproduction area.

According to various embodiments, the display module may output a second reproduction area floating in at least a part of the first reproduction area.

According to various embodiments, the display module may stop outputting at least one of the reproduction areas in response to an input for the reproduction area provided as the interface.

According to various embodiments, the display module may change a shape of at least one of the reproduction areas in response to an input for the reproduction area provided as the interface.

According to various embodiments, the electronic device may further include a setting module for defining a shape of at least one of the first reproduction area and the second reproduction area. According to various embodiments, the setting module may define a shape of at least one of the reproduction areas according to each application.

According to various embodiments, the generation module may generate the recording data by recording one or more images output in the first reproduction area and the second reproduction area in a form of layers.

According to various embodiments, the generation module may generate the recording data by recording one or more images output in the first reproduction area and the second reproduction area in a recording scheme corresponding to an input for the reproduction area provided as the interface. According to various embodiments, the recording scheme may include at least one of a mode in which both an image and a voice are recorded with respect to one or more recording images, a mode in which only a voice is recorded with respect to one or more recording images, and a mode in which only one of the first image and the second image is recorded.

According to various embodiments, the display module may output a list of generated recording data, acquire a first image and a second image of recording data corresponding to an input from the list, and reproduce the first image and the second image.

Figure 3:
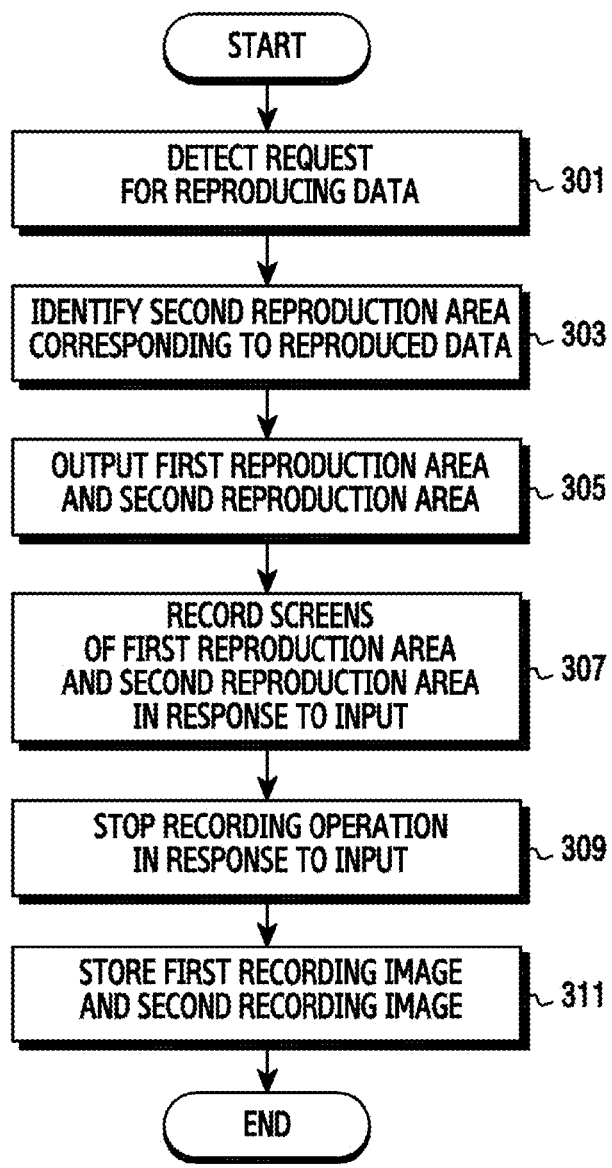
FIG. 3 is a flowchart illustrating a data generation operation by an electronic device according to various embodiments of the present disclosure.

FIG. 3 is a flowchart illustrating a data generation operation by an electronic device according to various embodiments of the present disclosure.

Referring to FIG. 3, the electronic device may detect a data reproduction request in operation 301. According to various embodiments, the data may include a game application, a multimedia data reproduction application, a browser application, a document making application, a chatting application, etc.

In operation 303, the electronic device may identify a second reproduction area corresponding to the reproduced data. According to an embodiment, the electronic device may identify a position, a size, a shape, etc. of the second reproduction area predefined for the reproduced data. According to another embodiment, the electronic device may identify a position, a size, a shape, etc. of the second reproduction area which have been previously used for the reproduced data.

In operation 305, the electronic device may output a first reproduction area and a second reproduction area. According to various embodiments, a first image (for example, a data reproduction screen) may be output in the first reproduction area, and a second image (for example, an image acquired through a camera) may be output in the second reproduction area. For example, as will be described below in more detail with reference to FIG. 5, when a request for reproducing a game application is detected as indicated by reference numeral, the electronic device may output an execution screen of the game application in the first reproduction area and output a user image input through a camera in a second reproduction area. According to various embodiments, the second reproduction area may be associated with a command for recording screens output in the first reproduction area and the second reproduction area.

In operation 307, the electronic device may record the screens (images) output in the first reproduction area and the second reproduction area in response to an input. For example, the electronic device may generate a first recording image by recording the image output in the first reproduction area and a second recording image by recording the image reproduced in the second reproduction area. According to an embodiment, when an input in the second reproduction area is detected, the electronic device may perform the recording operation. For example, as will be described below in more detail with reference to FIG. 7A, the electronic device may perform the recording operation in response to detection of an input in the second reproduction area as indicated by reference numeral.

In operation 309, the electronic device may stop the recording operation of the screens output in the first reproduction area and the second reproduction area in response to an input making a request for stopping the recording. According to various embodiments, in response to detecting an input in the second reproduction area while performing the recording operation, the electronic device may stop the recording operation.

According to various embodiments, when the electronic device detects an input for controlling the reproduction areas while performing the recording operation or in a state where the recording operation stops, the electronic device may control the output reproduction areas. For example, as illustrated in FIGS. 8 to 14, controlling the output reproduction areas may include changing positions of the reproduction areas, controlling sizes of the reproduction areas, stopping outputting of the reproduction areas, and changing a recording mode. According to an embodiment, the recording mode may include a mode in which both an image and a voice are recorded with respect to one or more recording images, a mode in which only a voice is recorded with respect to one or more recording images, and a mode in which only one of a first image and a second image is recorded.

In operation 311, the electronic device may store the first recording image and the second recording image. According to various embodiments, the electronic device may separately store the first recording image and the second recording image in a storage space such as a memory. In this case, when the electronic device detects a request for reproducing recording data, the electronic device may acquire the first recording image and the second recording image which have been separately stored, and may reproduce the first recording image and the second recording image together.

According to various embodiments, the electronic device may combine the first recording image and the second recording image into one data and store the one combined data in a storage space such as a memory. In this case, when the electronic device detects a request for reproducing recording data, the electronic device may reproduce the first recording image and the second recording image together through reproduction of the combined data.

According to various embodiments, the electronic device may store the first recording image and the second recording image in a server or a storage space of another electronic device.

Figure 4:
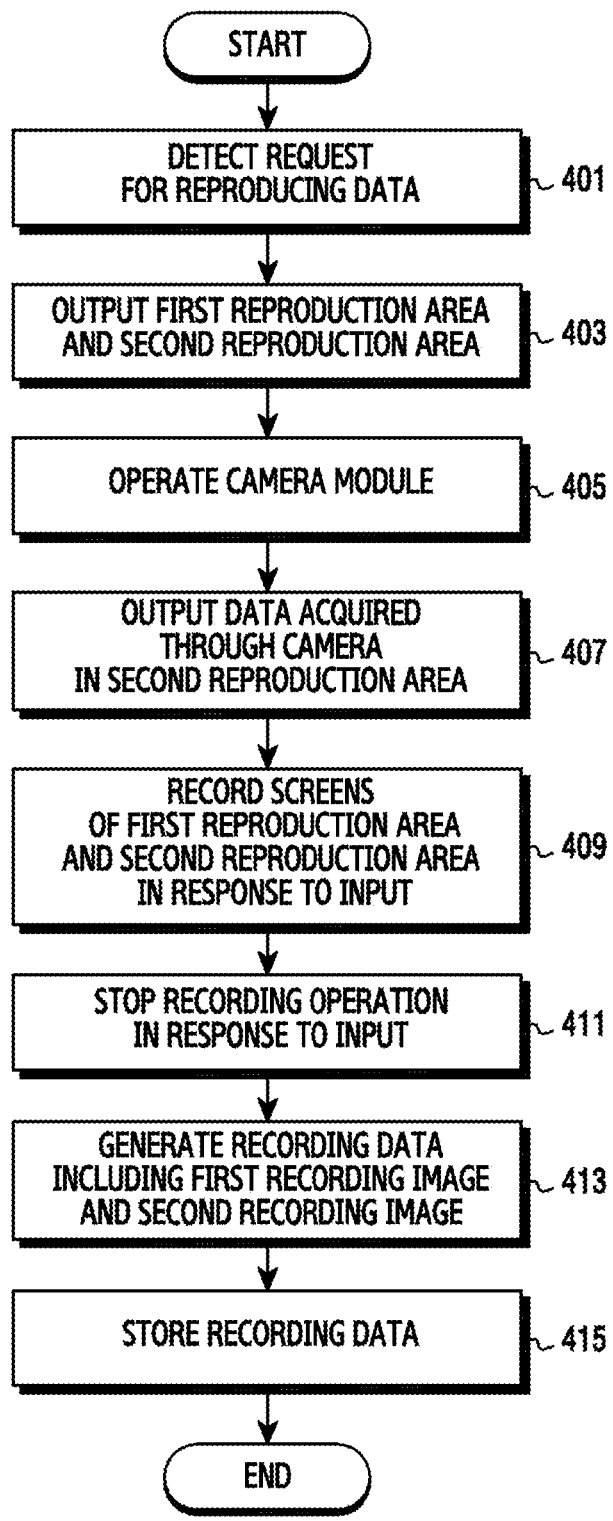
FIG. 4 is a flowchart illustrating a data generation operation by an electronic device according to various embodiments of the present disclosure.

FIG. 4 is a flowchart illustrating a data generation operation by an electronic device according to various embodiments of the present disclosure. Descriptions of FIG. 4 identical or similar to the descriptions of FIG. 3 may be omitted.

Referring to FIG. 4, the electronic device may detect a data reproduction request in operation 401. According to various embodiments, the electronic device may detect a request for executing a pre-installed application.

In operation 403, the electronic device may output a first reproduction area and a second reproduction area related to the reproduced data. According to various embodiments, the first reproduction area may occupy an entire display and the second reproduction area may occupy a part of the first reproduction area. According to various embodiments, the first reproduction area may occupy a part of the display and the second reproduction area may occupy another part of the display which is not occupied by the first reproduction area.

According to various embodiments, the electronic device may output, in the first reproduction area, a reproduction screen of the data requested to be reproduced.

In operation 405, the electronic device may operate an image acquisition apparatus, for example, a camera module for acquiring an image to be output in the second reproduction area.

In operation 407, the electronic device may output an image acquired through a camera in the second reproduction area.

In operation 409, the electronic device may perform an operation for recording an image (for example, a first image) output in the first reproduction area and an image output in the second reproduction area in response to an input. For example, the electronic device may generate a first recording image by recording the image output in the first reproduction area and a second recording image by recording the image reproduced in the second reproduction area.

In operation 411, the electronic device may stop the recording operation of the screens output in the first reproduction area and the second reproduction area in response to an input making a request for stopping the recording.

According to various embodiments, when the electronic device detects an input for controlling the reproduction areas while performing the recording operation or in a state where the recording operation stops, the electronic device may control the output reproduction areas.

In operation 413, the electronic device may generate recording data including the first recording image and the second recording image.

According to various embodiments, the electronic device may generate recording data including a plurality of layers. According to an embodiment, the electronic device may generate a second recording image including a plurality of layers and may store the generated second recording image to associate with the first recording image.

According to various embodiments, the electronic device may generate one recording data created by combining the first recording image and the second recording image.

In operation 415, the electronic device may store the recording data created by the first recording image and the second recording image. According to various embodiments, the electronic device may store the recording data in a memory included in the electronic device. Further, the electronic device may be connected to another electronic device, a storage medium, or a server to store the recording data therein.

Figure 5:
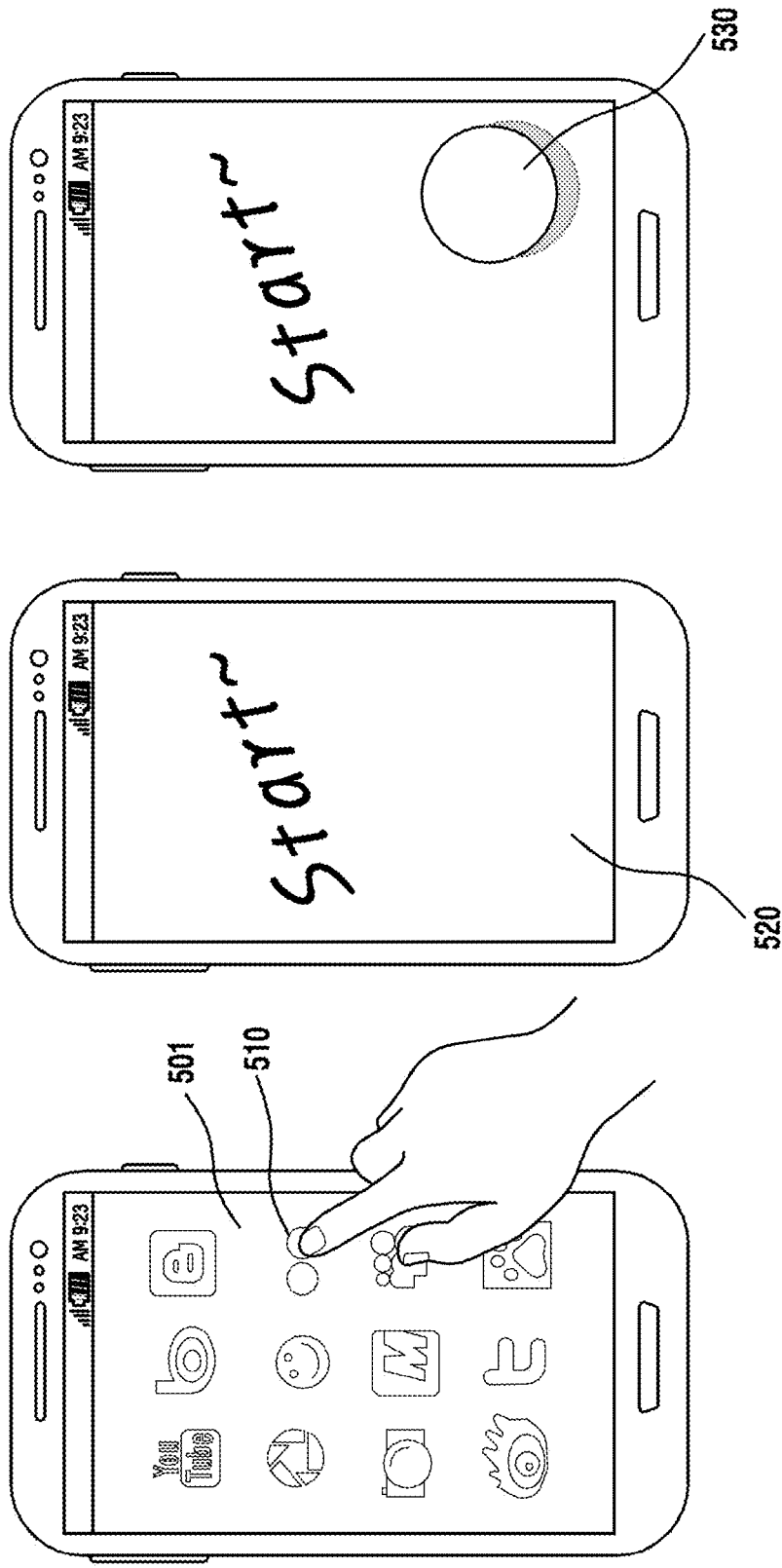
FIG. 5 illustrates a data reproduction operation by an electronic device according to various embodiments of the present disclosure.

FIG. 5 illustrates a data reproduction operation by an electronic device according to various embodiments of the present disclosure.

Referring to FIG. 5, the electronic device may generate data (for example, recording data) including a data reproduction screen and an image acquired through a camera. According to various embodiments, the data reproduction screen may be an application execution screen.

As illustrated in FIG. 5, when the electronic device detects an input 510 for executing an application 501, the electronic device may output an execution screen of the application corresponding to the input.

According to various embodiments, an area in which the application execution screen is output may be defined as a first reproduction area 520. The electronic device may output a second reproduction area 530, in which the image acquired through a camera can be output, in the first reproduction area 520, that is, the application execution screen.

According to various embodiments, the second reproduction area 530 may be separated from the first reproduction area 520. The separation may mean that the second reproduction area 530 can be controlled in response to a user's input regardless of the first reproduction area 520. For example, the second reproduction area 530 may be a screen floating in the first reproduction area 520, and a position, a size, a shape, a color, etc. of the second reproduction area 530 may change in response to the input.

According to various embodiments, the second reproduction area 530 may have not only a standard shape such as a circle, a quadrangle, or a triangle, but also an irregular shape based on an input.

According to various embodiments, the second reproduction area 530 may be an interface for generating a command for recording the images output in the first reproduction area 520 and the second reproduction area 530.

The present embodiment will be made based on a condition where the second reproduction area 530 is output according to the output of the application execution screen.

According to various embodiments, the second reproduction area 530 may not be output although the application execution screen is output. Further, when the electronic device detects a predefined input after outputting the application execution screen, the electronic device may output the second reproduction area 530.

According to various embodiments, the second reproduction area 530 may be generated by a particular application. For example, when another application supported by the particular application is executed in a state where the particular application is executed, the second reproduction area 530 may be output.

Figure 6A:
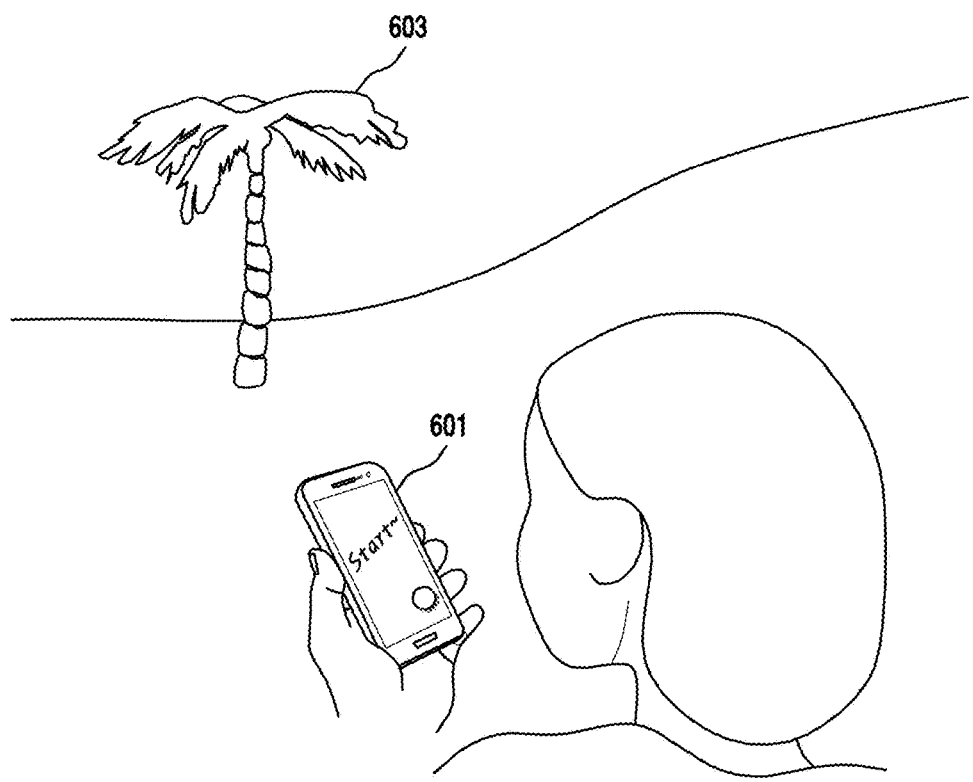
FIGS. 6A and 6B illustrate a data reproduction operation by an electronic device according to various embodiments of the present disclosure.
Figure 6B:
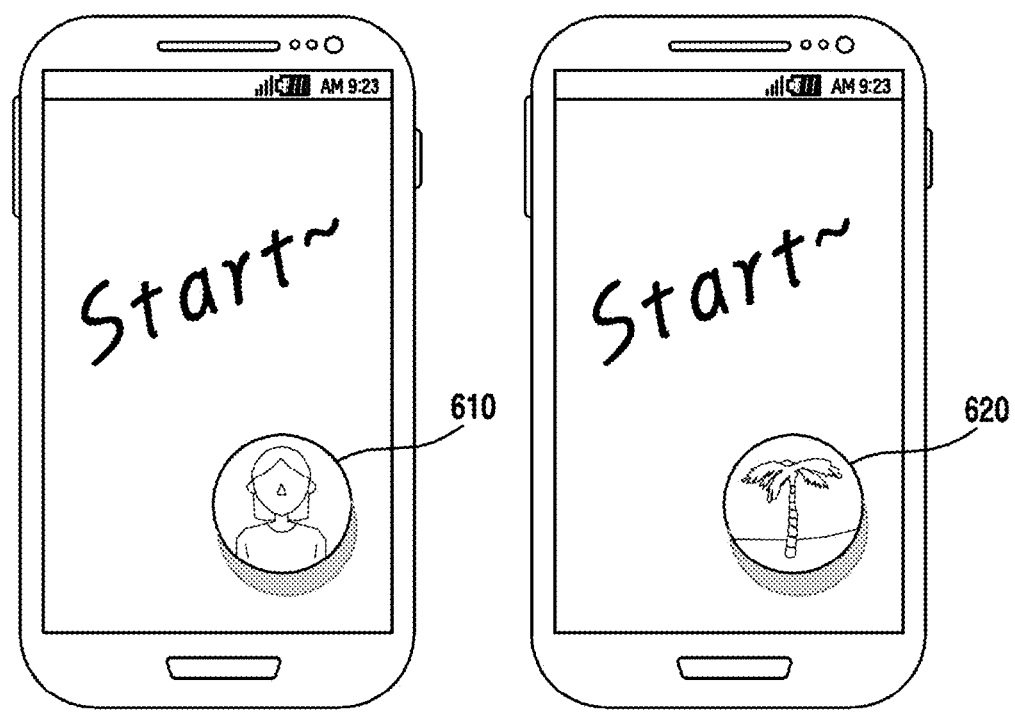

FIGS. 6A and 6B illustrate a data reproduction operation by an electronic device according to various embodiments of the present disclosure.

The electronic device according to various embodiments may define an area, in which an application execution screen is output, as a first reproduction area, and may output a second reproduction area, in which an image acquired through a camera can be output, in the first reproduction area.

Referring to FIG. 6A, the electronic device 601 may acquire images through one or more cameras in a plurality of directions. According to an embodiment, the electronic device 601 may acquire a side image of a user who holds the electronic device through a camera mounted to a front portion of the electronic device. According to another embodiment, the electronic device 601 may acquire an image of a background 603 which the user holding the electronic device watches through a camera mounted to a rear portion of the electronic device.

Referring to FIG. 6B, the electronic device may output the user side image 610 or the background image 620 which the user watches, in the second reproduction screen.

According to various embodiments, the electronic device may change the image output in the second reproduction screen in response to an input. For example, when the electronic device detects an input in a state where the user side image is output in the second reproduction screen, the electronic device may output the background image.

Although FIGS. 6A and 6B have described a condition where the electronic device outputs the image acquired through camera in the second reproduction area, the electronic device according to the various embodiments may output pre-stored data (video data, audio data, image data, text data, and the like) in the second reproduction area. According to various embodiments, the electronic device may receive data from a server or another electronic device and output the data in the second reproduction area.

Figure 7A:
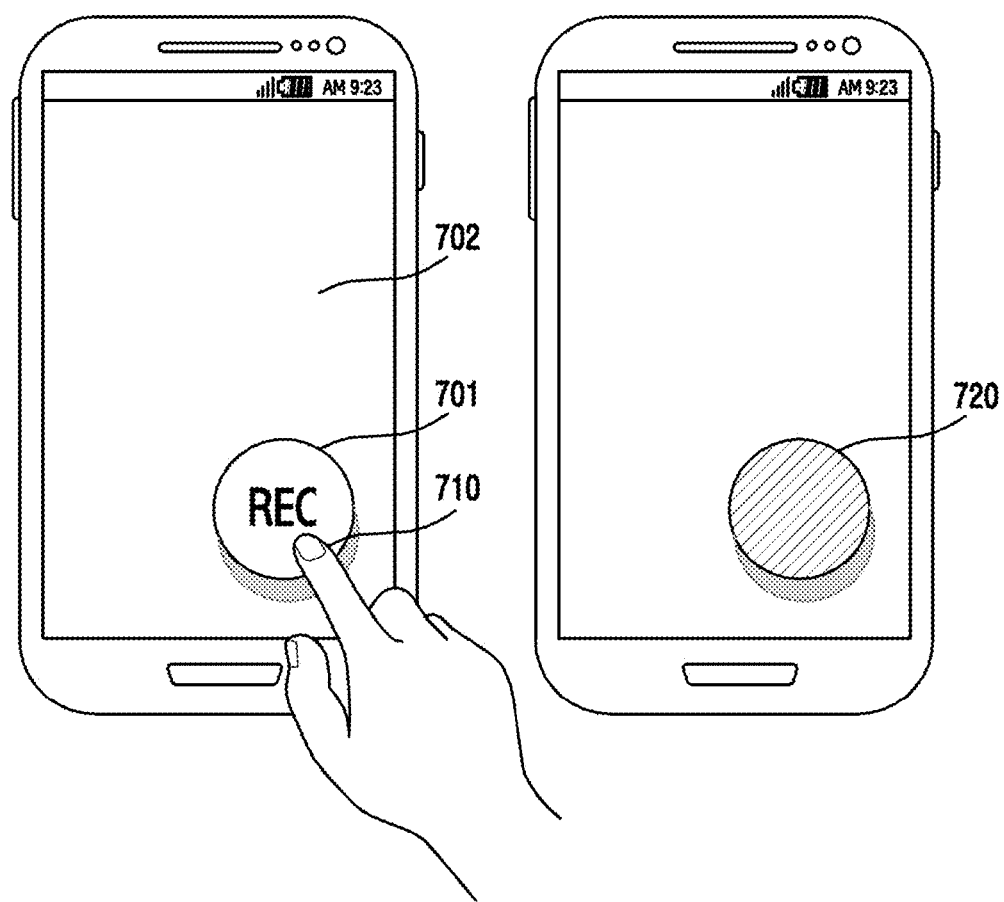
FIGS. 7A and 7B illustrate an operation of an electronic device according to various embodiments of the present disclosure.
Figure 7B:
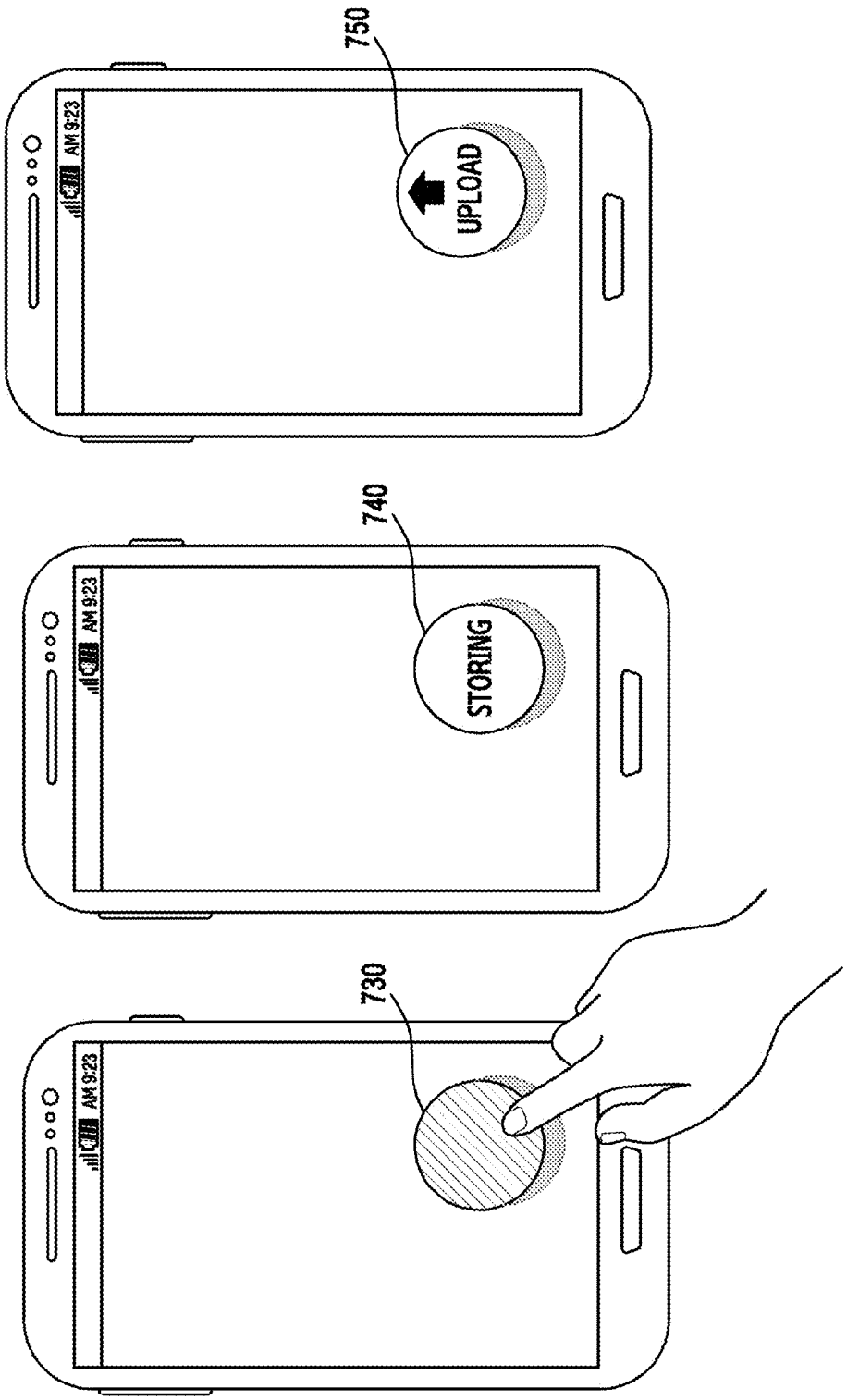

FIGS. 7A and 7B illustrate an operation of an electronic device according to various embodiments of the present disclosure.

Referring to FIG. 7A, the electronic device may provide an interface for generating a command for recording a second reproduction area 701.

According to various embodiments, the electronic device may output information (for example, an REC icon) indicating a recording function in a part of the second reproduction area 701. For example, the electronic device may output only the information indicating the recording function in the second reproduction area 701 without outputting an image (for example, an image acquired through a camera) before a recording operation is executed. In another example, the electronic device may additionally output the information indicating the recording function in a state where the image is output in the second reproduction area 701.

As illustrated in FIG. 7A, when the electronic device detects an input 710 in the second reproduction area 701, the electronic device may record images output in the first reproduction area 702 and the second reproduction area 702.

According to an embodiment, when the recording operation is executed, the electronic device may output information on a recorded image and a recording time, and information indicating that recording is performed in the second reproduction area 701. In FIG. 7A, the shade in the second reproduction area 720 represents a condition where a recorded image, for example, an image acquired through a camera is output.

Referring to FIG. 7B, when the electronic device detects an input 730 in the second reproduction area during the recording, the electronic device may stop the recording operation. According to various embodiments, the electronic device may output information 740 indicating termination of the recording or storage of the recording data in the second reproduction area as the recording operation stops. According to various embodiments, when the recording data is completely stored, for example, when a predetermined time elapses after the storage is completed or an input in the second reproduction area is detected after the storage is completed, the electronic device may perform an operation for uploading the recording data to another electronic device, a server, or a storage medium. According to an embodiment, after outputting upload information 750 in the second reproduction area, the electronic device may upload recording data according to the detection of the input in the second reproduction area.

Figure 8:
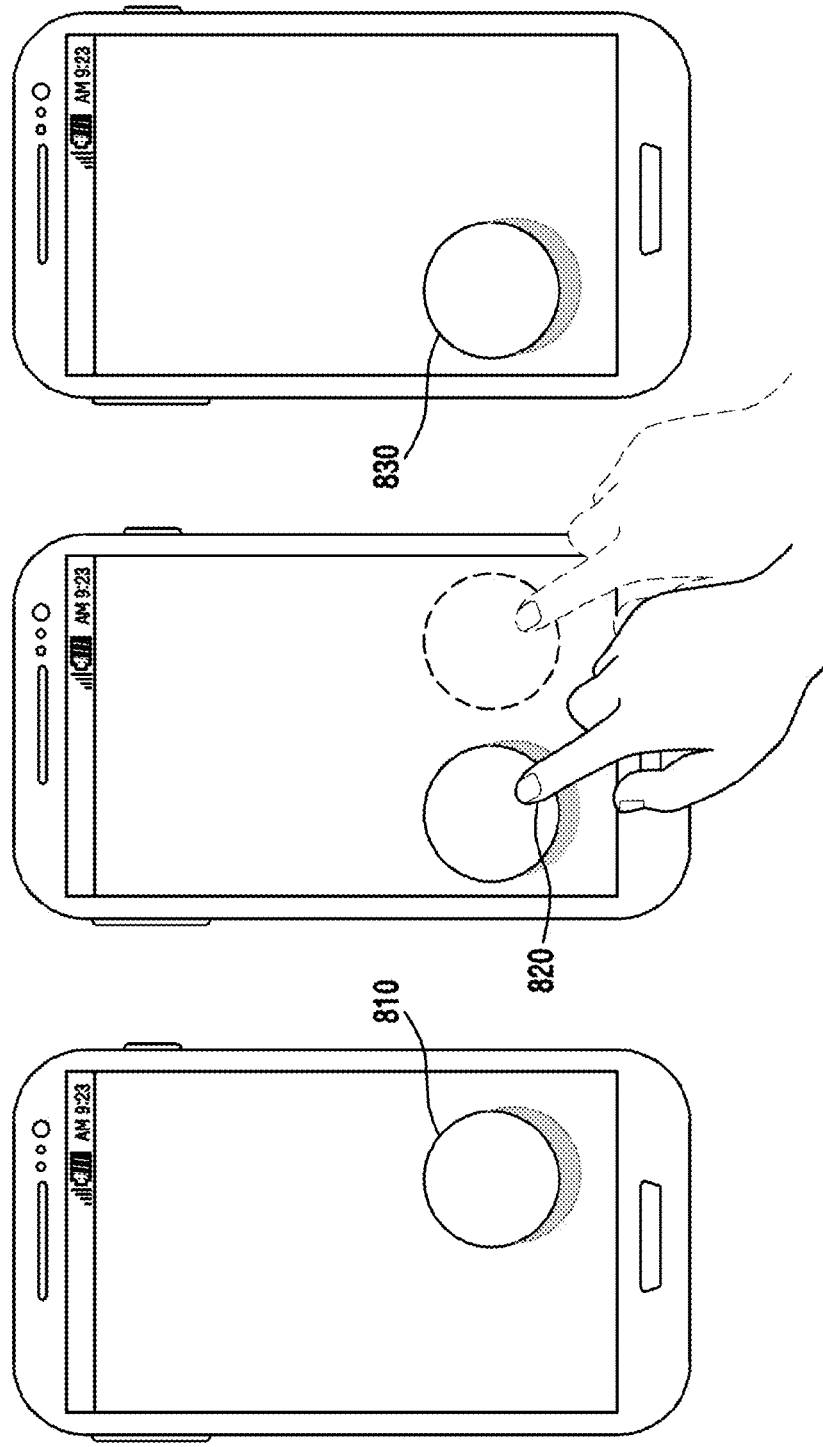
FIG. 8 illustrates an operation of an electronic device according to various embodiments of the present disclosure.

FIG. 8 illustrates an operation of an electronic device according to various embodiments of the present disclosure.

Referring to FIG. 8, the electronic device may provide an interface for generating a command for recording. The interface may be a second reproduction area 810 in which an image acquired through a camera is output.

According to various embodiments, the electronic device may change a position of the second reproduction area 810 in response to an input.

As illustrated in FIG. 8, when an input of selecting the second reproduction area 810 output in a lower right end of the screen of the electronic device is moved to the left side as indicated by reference numeral 820, the electronic device may move a position of the second reproduction area to the left side and output the second reproduction area on the left side as indicated by reference numeral 830.

Figure 9:
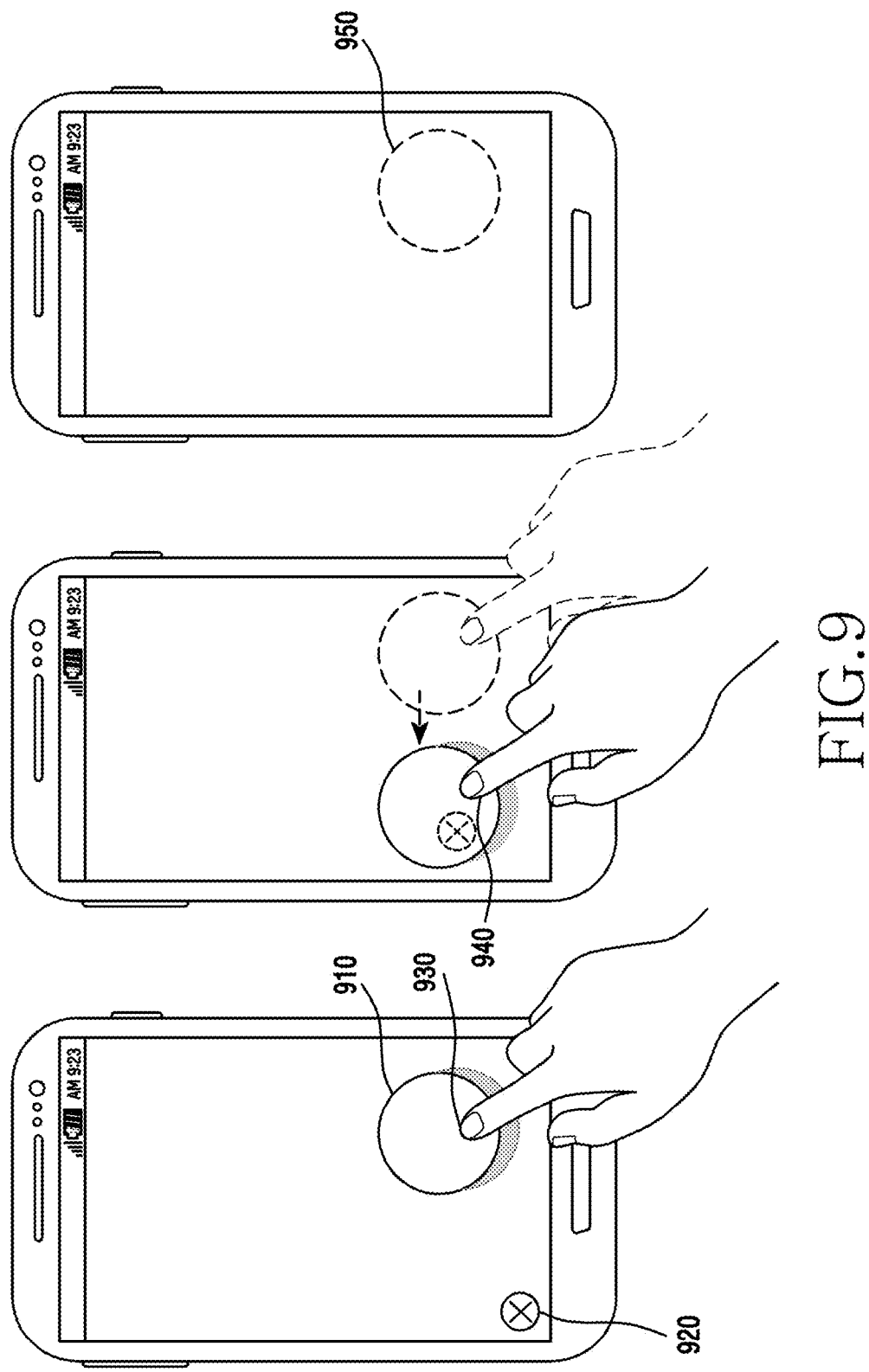
FIG. 9 illustrates an operation of an electronic device according to various embodiments of the present disclosure.

FIG. 9 illustrates an operation of an electronic device according to various embodiments of the present disclosure.

Referring to FIG. 9, the electronic device may provide an interface for generating a command for recording. The interface may be a second reproduction area 910 in which an image acquired through a camera is output.

According to various embodiments, the electronic device may stop outputting the second reproduction area 910 in response to an input.

As illustrated in FIG. 9, when an input of selecting the second reproduction area 910 is output in the lower right end of the screen of the electronic device is detected, the electronic device may output a menu 920 for stopping outputting of the second reproduction area 910 may be output.

According to various embodiments, when the menu 920 for stopping the output of the second reproduction area 910 is detected, the electronic device may stop outputting the pre-output second reproduction area 910.

For example, when a predefined input (for example, a long touch input) 930 in the second reproduction area 910 is detected, the electronic device may output the menu 920 for stopping outputting of the second reproduction area 910, and may stop outputting the second reproduction area 910 in response to an input 940 for moving the second reproduction area 910 to the menu 920 for stopping the output as indicated by reference numeral 950. In another example, the electronic device may stop outputting the second reproduction area 910 in response to an input for moving the menu 920 for stopping the output to the second reproduction area 910 as indicated by reference numeral 950.

Figure 10:
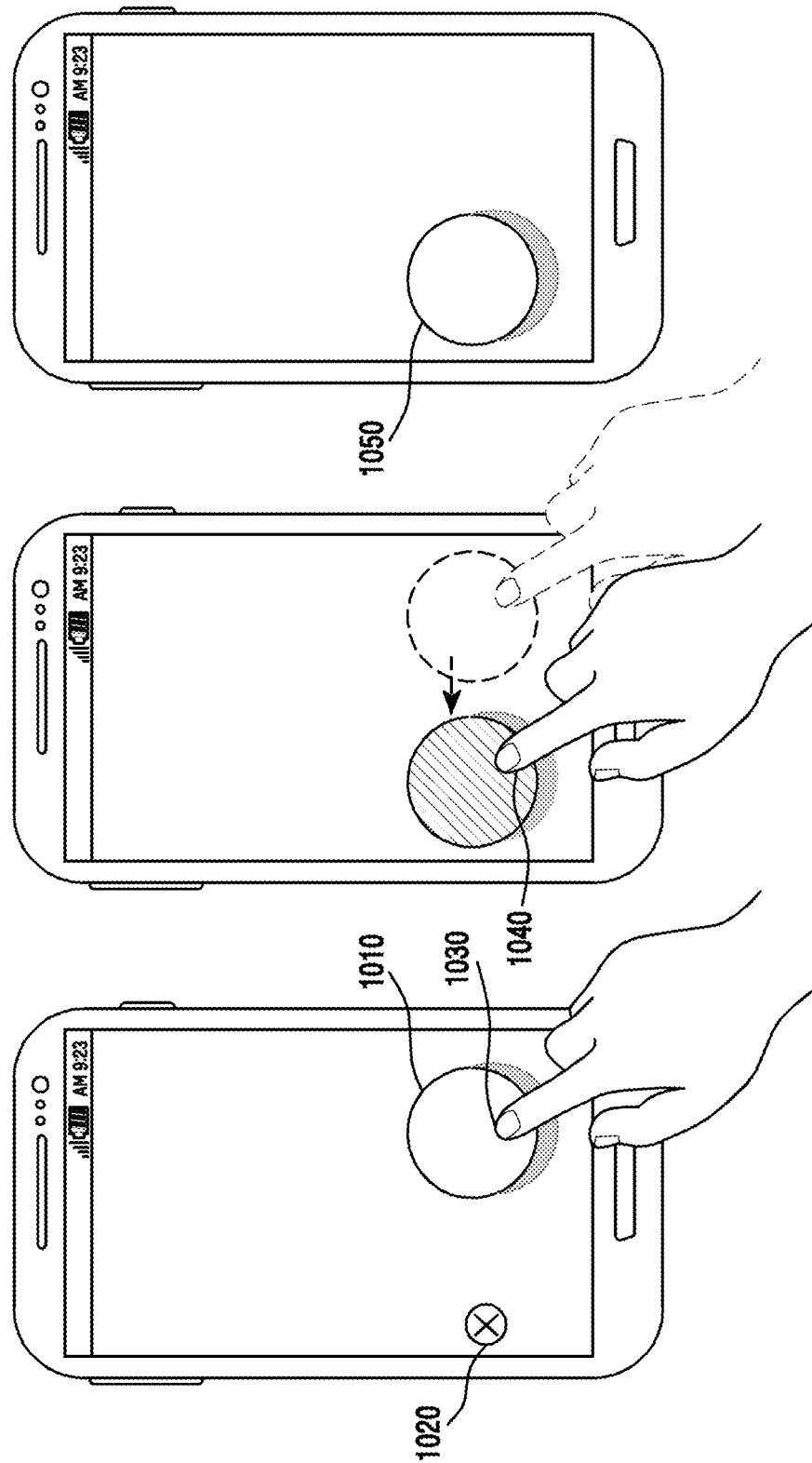
FIG. 10 illustrates an operation of an electronic device according to various embodiments of the present disclosure.

FIG. 10 illustrates an operation of an electronic device according to various embodiments of the present disclosure.

Referring to FIG. 10, the electronic device may provide an interface for generating a command for recording. The interface may be a second reproduction area 1010 in which an image acquired through a camera is output.

According to various embodiments, the electronic device may stop recording an image of the second reproduction area 1010 in response to an input.

According to an embodiment, the electronic device may detect an input 1030 in the second reproduction area 1010 to activate or inactivate a recording operation. For example, when the input 1030 in the second reproduction area 1010 is detected in a state where the recording operation is inactivated, the electronic device may activate the recording operation, and record the images output in the second reproduction area and the first reproduction area. In another example, when the input in the second reproduction area 1010 is detected in a state where the recording operation is activated, the electronic device may inactivate the recording operation.

According to another embodiment, the electronic device may output a menu 1020 for stopping the recording operation in response to an input. When an input for the menu 1020 for stopping the recording operation is detected, the electronic device may stop the recording operation. For example, the electronic device may stop the recording operation in response to an input 1040 for moving the second reproduction area 1010 to the menu 1020 for stopping the recording operation as indicated by reference numeral 1050.

As illustrated in FIG. 10, shade processing of the second reproduction area may represent the performance of the recording operation and non-shade processing may represent non-performance of the recording operation.

Figure 11:
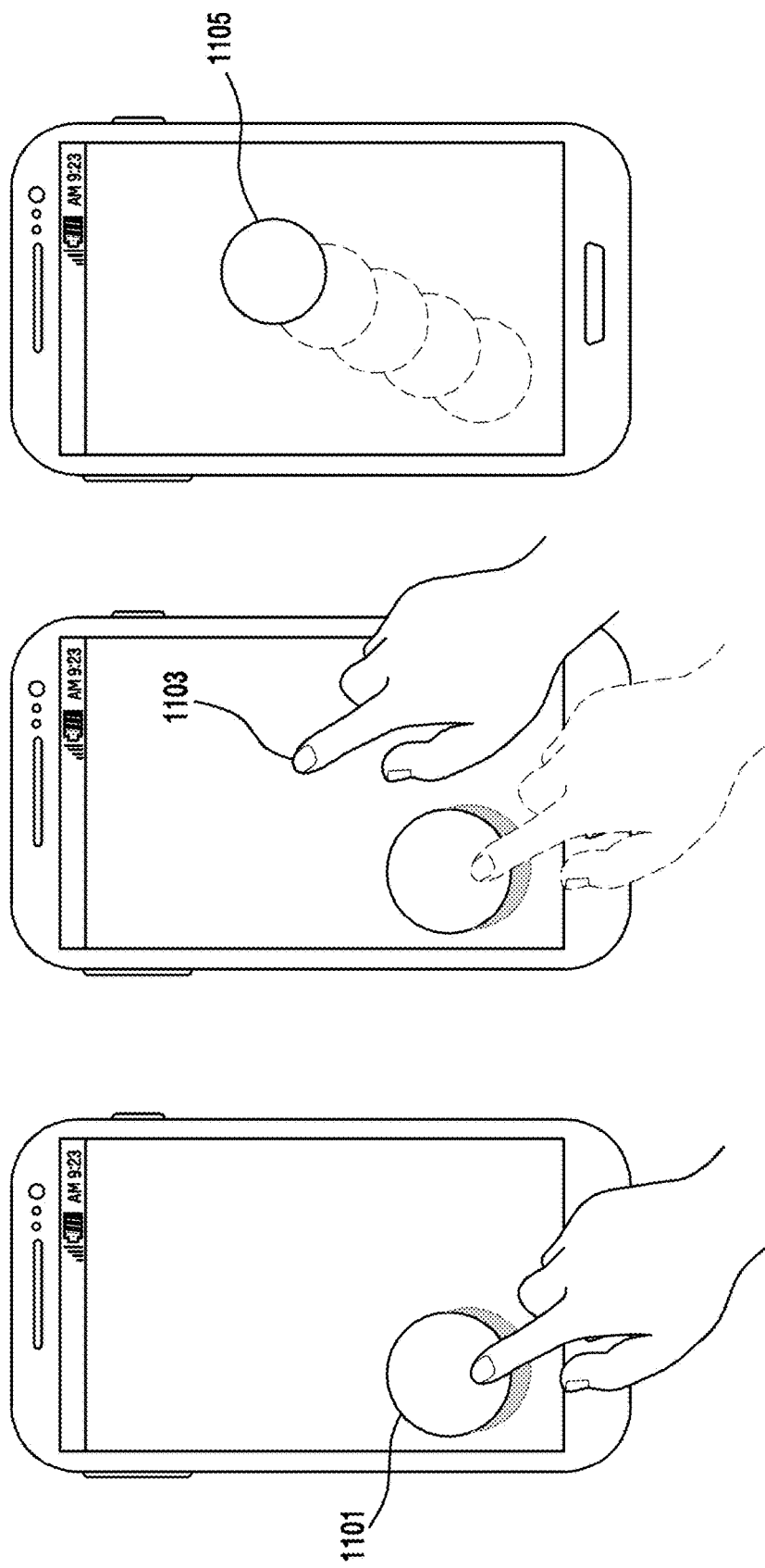
FIG. 11 illustrates an operation of an electronic device according to various embodiments of the present disclosure.

FIG. 11 illustrates an operation of an electronic device according to various embodiments of the present disclosure.

Referring to FIG. 11, the electronic device may provide an interface for generating a command for recording. The interface may be a second reproduction area 1101 in which an image acquired through a camera is output.

According to various embodiments, the electronic device may change a position of the second reproduction area in response to an input.

As illustrated in FIG. 11, the position of the second reproduction area may be changed in response to an input of selecting the second reproduction area 1101 output in the lower left end of the screen of the electronic device. For example, the input may be a flicking gesture 1103, and the electronic device may move the second reproduction area in the first position to the second reproduction area in a second position as indicated by reference numeral 1105. According to an embodiment, the electronic device may determine the position of the second reproduction area based on a direction and a speed of the gesture.

Figure 12:
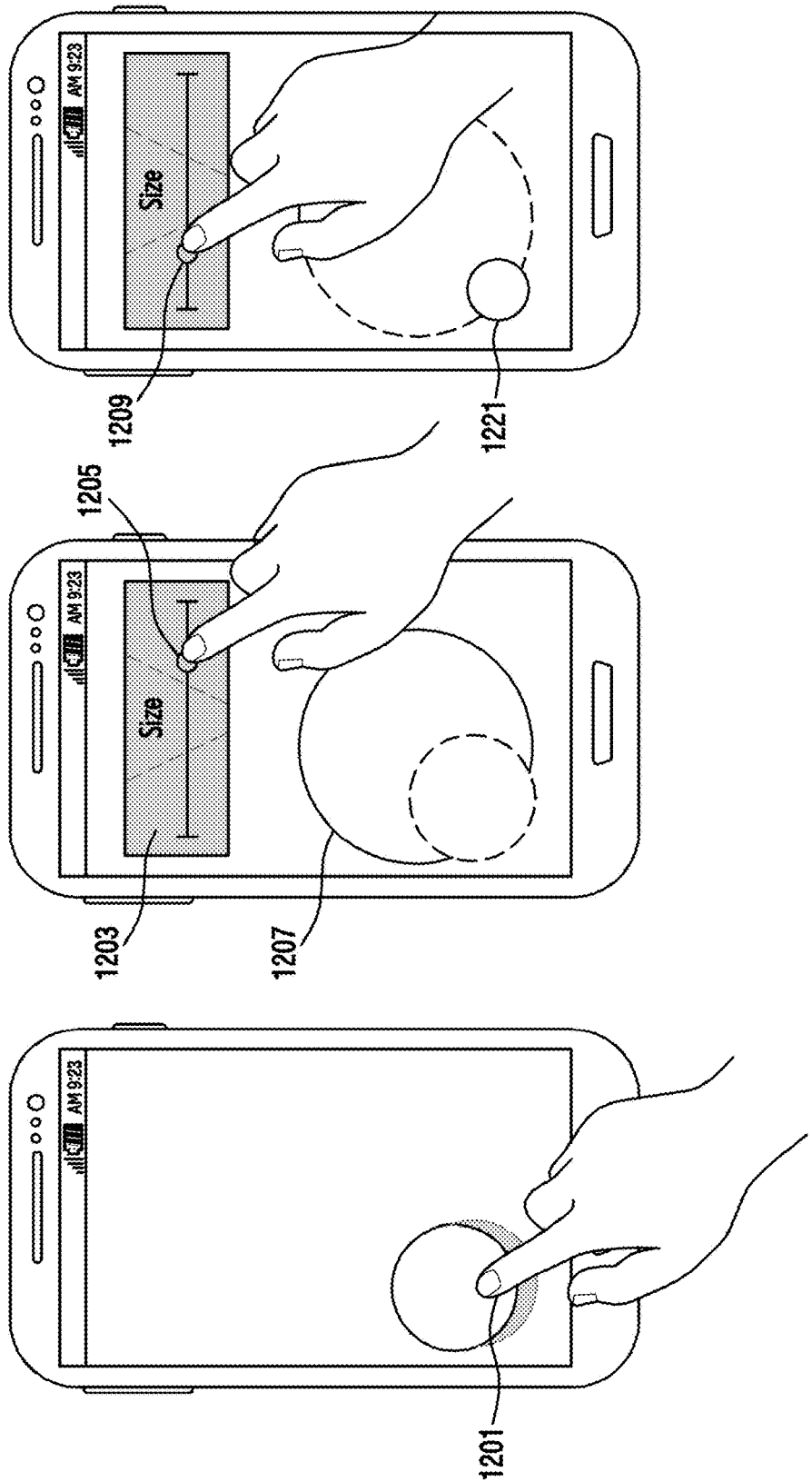
FIG. 12 illustrates an operation of an electronic device according to various embodiments of the present disclosure.

FIG. 12 illustrates an operation of an electronic device according to various embodiments of the present disclosure.

Referring to FIG. 12, the electronic device may generate a command for recording and provide a second reproduction area for outputting an image acquired through a camera.

According to various embodiments, the electronic device may change the size of the second reproduction area in response to an input.

As illustrated in FIG. 12, the size of the second reproduction area may be changed in response to an input 1201 of selecting the second reproduction area output in the lower left end of the screen of the electronic device. For example, when a predefined input (for example, a long touch input) in the second reproduction area is detected, the electronic device may output a menu 1203 for controlling the size of the second reproduction area, and may enlarge the second reproduction area having a first size in response to an input 1205 for the output menu as indicated by reference numeral 1207. Further, the electronic device may reduce the size of the second reproduction area in response to an input 1209 for the output menu as indicated by reference numeral 1221.

Figure 13:
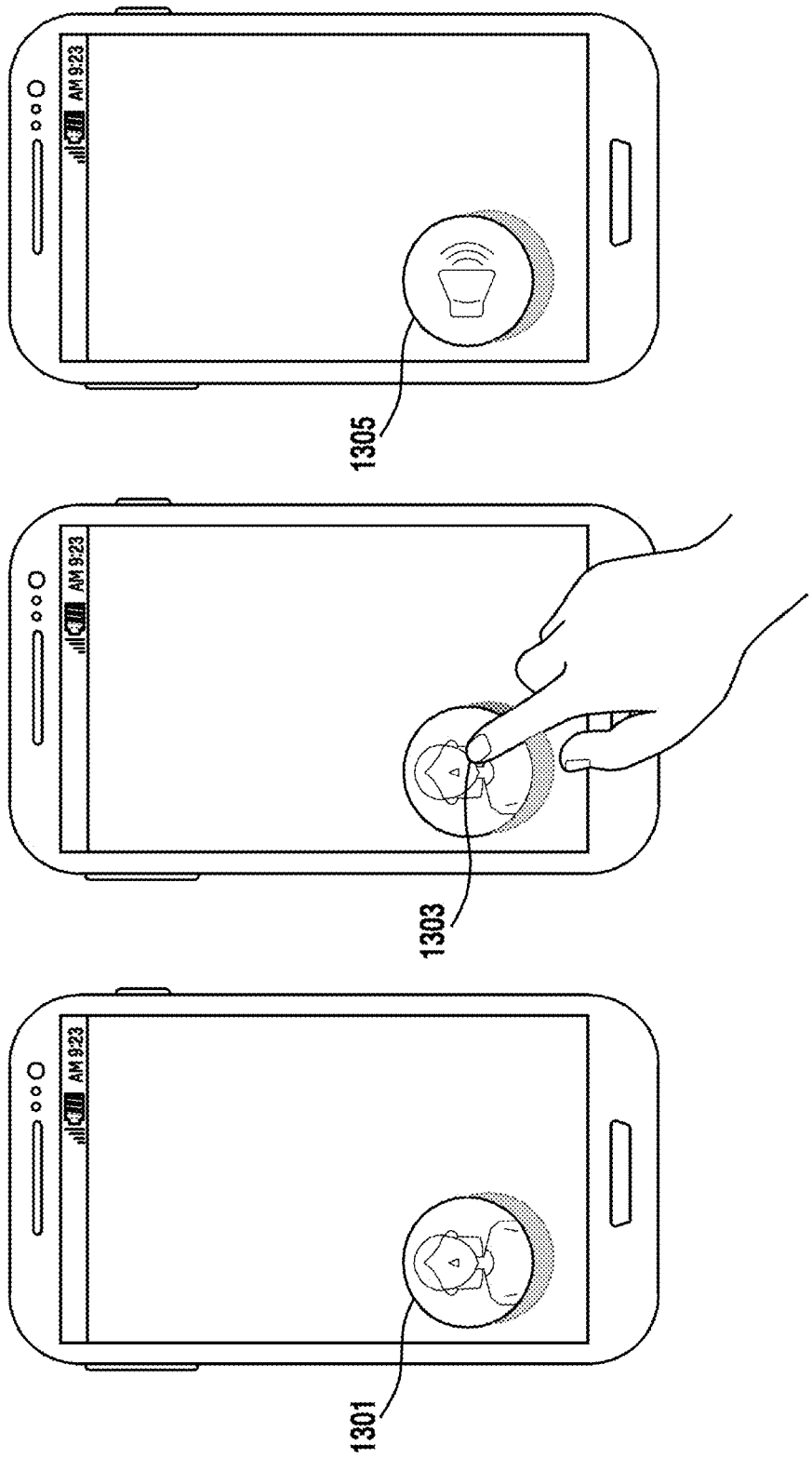
FIG. 13 illustrates an operation of an electronic device according to various embodiments of the present disclosure.

FIG. 13 illustrates an operation of an electronic device according to various embodiments of the present disclosure.

According to various embodiments, the electronic device may change a recording mode in response to an input.

According to an embodiment, the recording mode may include, with respect to one or more recording images, a mode in which both an image and a voice are recorded, a mode in which only a voice is recorded, and a mode in which only one of a first image and a second image is recorded.

Referring to FIG. 13, when the electronic device detects an input 1303 in a second reproduction area 1301 while recording an image output in the second reproduction area 1301 and a voice, the electronic device may change the mode into a mode in which only the voice is recorded as indicated by reference numeral 1305. According to another embodiment, when the electronic device detects the input in the second reproduction area while recording only a voice as indicated by reference numeral 1305, the electronic device may change the mode into a mode in which only an image output in the first reproduction area is recorded.

Figure 14:
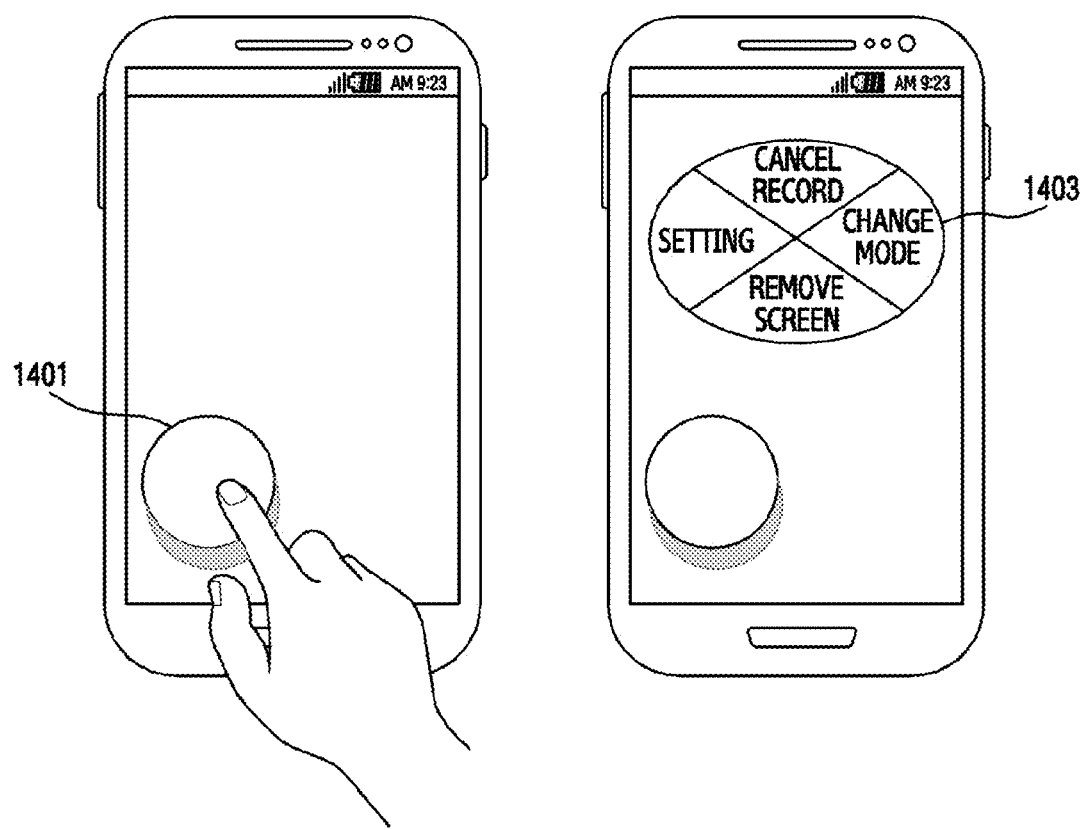
FIG. 14 illustrates an operation of an electronic device according to various embodiments of the present disclosure.

FIG. 14 illustrates an operation of an electronic device according to various embodiments of the present disclosure.

According to various embodiments, the electronic device may output a menu for controlling a second reproduction area in response to an input. According to an embodiment, the menu for controlling the second reproduction area may include a setting menu, a recording cancel menu, a mode change menu, and a screen removal menu.

According to various embodiments, the setting menu may be a menu for entering a mode in which a shape of the second reproduction area is changed. For example, the electronic device may change the size, the shape, the color, etc. of the second reproduction area in response to an input for the menu.

According to various embodiments, the recording cancel menu may be a menu for stopping the recording operation of the screens output in the first reproduction area and the second reproduction area.

According to various embodiments, the mode change mode may be a menu for changing a recording mode, and the screen removal menu may be a menu for stopping outputting of the second reproduction area.

Referring to FIG. 14, when the electronic device detects an input in a second reproduction area 1401, the electronic device may output a menu 1403 for controlling the second reproduction area and perform an operation of a menu corresponding to a movement of the second reproduction area.

Figure 15A:
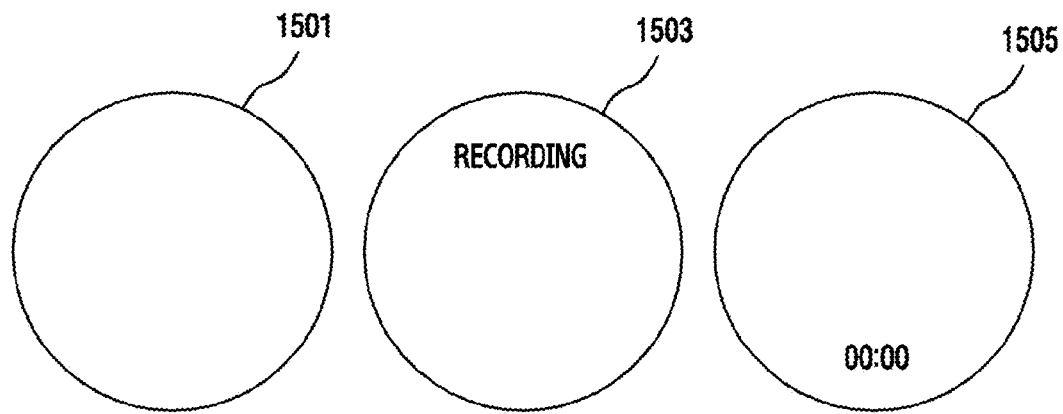
FIGS. 15A and 15B illustrate configurations of recording images according to various embodiments of the present disclosure.
Figure 15B:
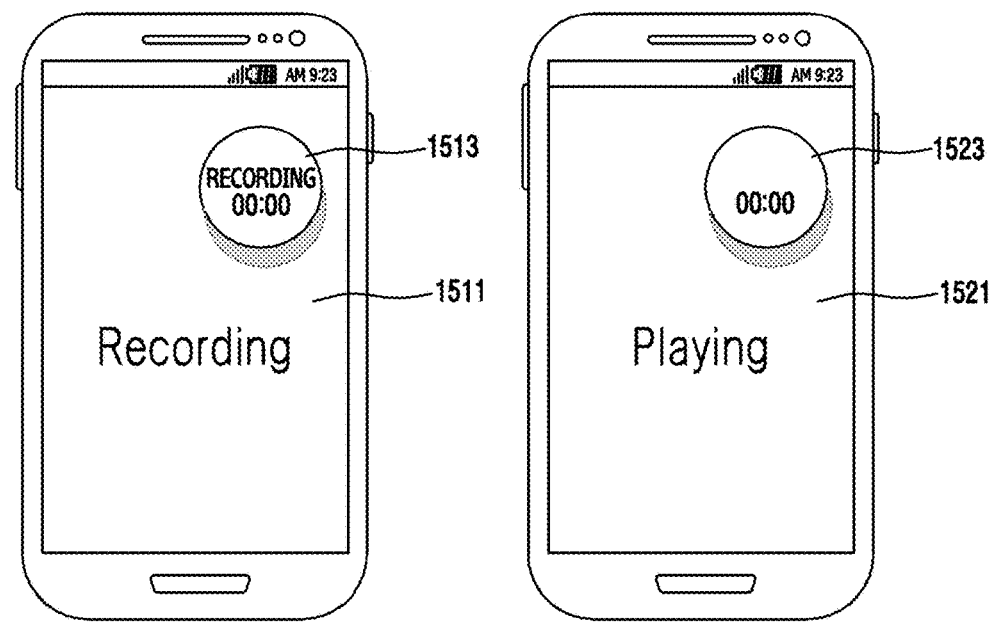

FIGS. 15A and 15B illustrate configurations of a recording image according to various embodiments of the present disclosure.

Referring to FIGS. 15A and 15B, the recording image includes a plurality of layers. A recording image of the second reproduction area (for example, a second recording image) will be described as an example. As illustrated in FIG. 15A, the recording image may include a layer 1501 including a second image, a layer 1503 including a recording notification icon, and a layer 1505 including a recording time.

According to various embodiments, the electronic device may change the configuration of the layers of the reproduction area.

According to an embodiment, as illustrated in FIG. 15B, when the electronic device performs a recording data generation operation 1511, the electronic device may output a second reproduction area 1513 including a layer including a second image, a layer including a recording notification icon, and a layer including a recording time.

According to an embodiment, when the electronic device performs a recording data reproduction operation 1521, the electronic device may output a second reproduction area 1523 from which one or more layers are removed to increase visibility of the second image. For example, the electronic device may output a second reproduction area including only the layer including the second image or a second reproduction area from which the layer including the recording notification icon is removed.

Figure 16:
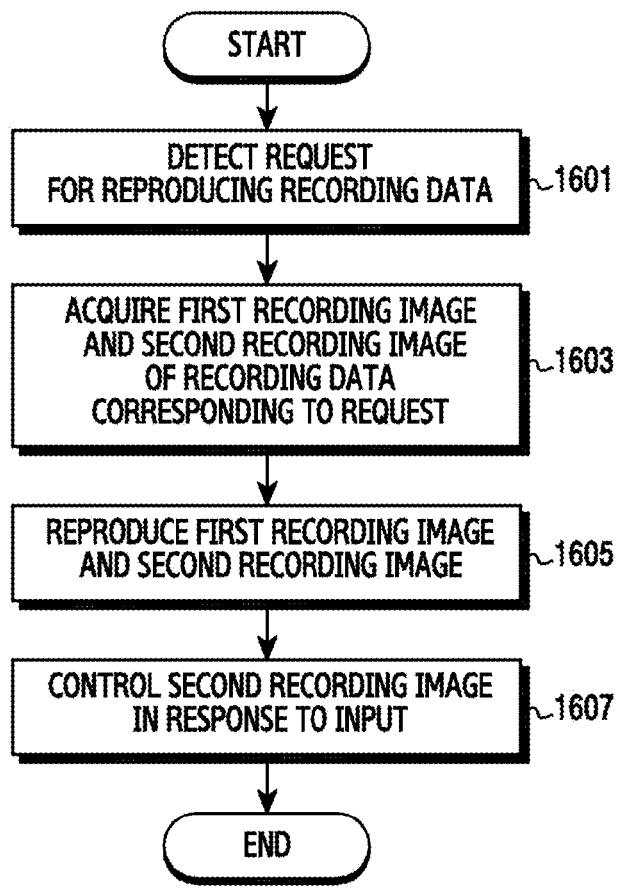
FIG. 16 is a flowchart illustrating a recording data reproduction operation by an electronic device according to various embodiments of the present disclosure.

FIG. 16 is a flowchart illustrating a recording data reproduction operation by an electronic device according to various embodiments of the present disclosure.

Figure 17:
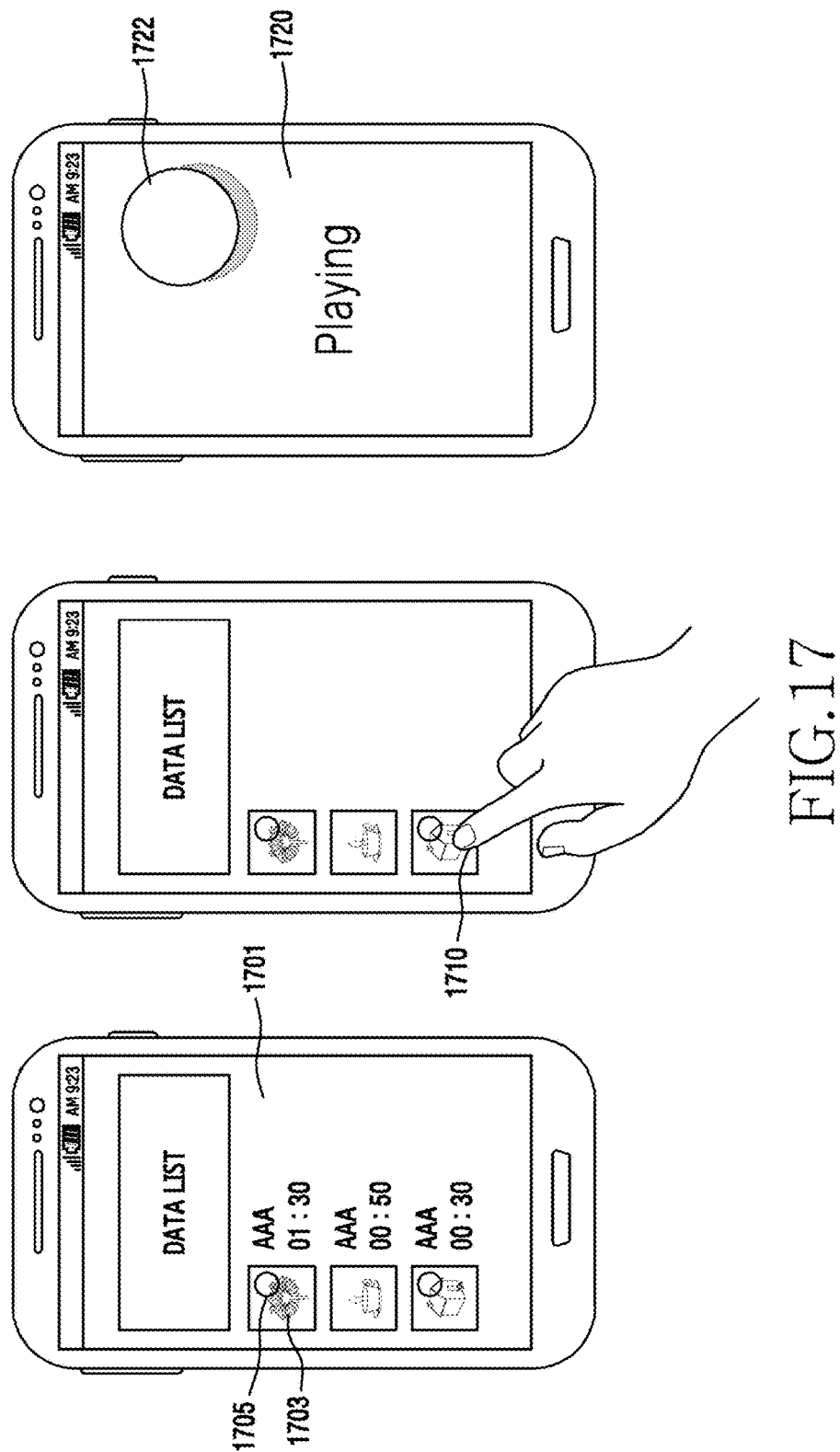
FIG. 17 illustrates a recording data reproduction operation by an electronic device according to various embodiments of the present disclosure.

Referring to FIG. 16, the electronic device may detect a data reproduction request (or a recording data reproduction request) in operation 1601. According to an embodiment, the electronic device may detect selection of recording data to be reproduced in a state where lists of recording data which can be reproduced are output. For example, the electronic device may output the lists of the recording data as illustrated in FIG. 17 below.

In operation 1603, the electronic device may acquire a first recording image and a second recording image of the recording data corresponding to a request.

In operation 1605, the electronic device may reproduce the acquired first recording image and second recording image.

In operation 1607, the electronic device may control the second recording image in response to an input. According to various embodiments, the electronic device may change the size or position of the second recording image or stop the output of the first recording image in response to an input.

FIG. 17 illustrates an operation of a recording data reproduction operation by an electronic device according to various embodiments of the present disclosure.

Referring to FIG. 17, the electronic device may output storage lists of recording data. For example, the electronic device may output lists 1701 by using a reduced image of the first recording image, for example, a thumbnail image 1703. In addition, the electronic device may add information informing that the second recording image is included in the reduced image of the recording image. As illustrated in FIG. 17, a circular icon 1705 added to the reduced image of the first recording image may be the information informing that the second recording image is included.

According to various embodiments, the information informing that the recording image is included may be the reduced image of the second recording image. According to various embodiments, the electronic device may generate a list by using a reduced image of recording data created by combining the first recording image and the second recording image. According to various embodiments, the electronic device may control (for example, reduce) one or more layers included in the second recording image to be a predefined size and add the controlled layer to the reduced image of the first recording image. For example, the one or more layers having the controlled size may be located in any position within the reduced image of the first recording image.

According to various embodiments, the electronic device may acquire a first recording image 1720 and a second recording image 1722 related to recording data selected in response to an input 1710 for selecting one or more pieces of recording data from the output list and may output the acquired first and second recording images 1720 and 1722.

According to various embodiments, a method of operating an electronic device may include outputting a first application execution screen in a first reproduction area in response to an application execution request, outputting a second reproduction area for generating a command related to recording data generation in at least a part of the first reproduction area, outputting a second application execution screen in the second reproduction area, and generating recording data in response to an input for the second reproduction area.

According to various embodiments, the outputting of the second reproduction area may include outputting a second reproduction area floating in at least a part of the first reproduction area.

According to various embodiments, the generating of the recording data may include at least one of determining a shape of the second reproduction area according to the command corresponding to the input for the second reproduction area, stopping outputting of the second reproduction area, determining a position of the second reproduction area, and determining a storage scheme.

According to various embodiments, the generating of the recording data may include outputting information related to data generation in at least one of the reproduction areas.

According to various embodiments, the generating of the recording data may include storing an execution screen output in at least one of the reproduction areas in a form of layers.

According to various embodiments, the generating of the recording data may include generating a recording image of an execution screen output in at least one of the reproduction areas, and generating recording data including the generated recoding image.

According to various embodiments, the method may include outputting a list of the generated recording data, acquiring a first application execution screen and a second application execution screen of recording data corresponding to an input from the output list, and reproducing the acquired execution screens.

According to various embodiments, the reproducing of the acquired execution screens may include changing and reproducing a layer configuration of at least one execution screen stored in a form of layers.

Figure 18:
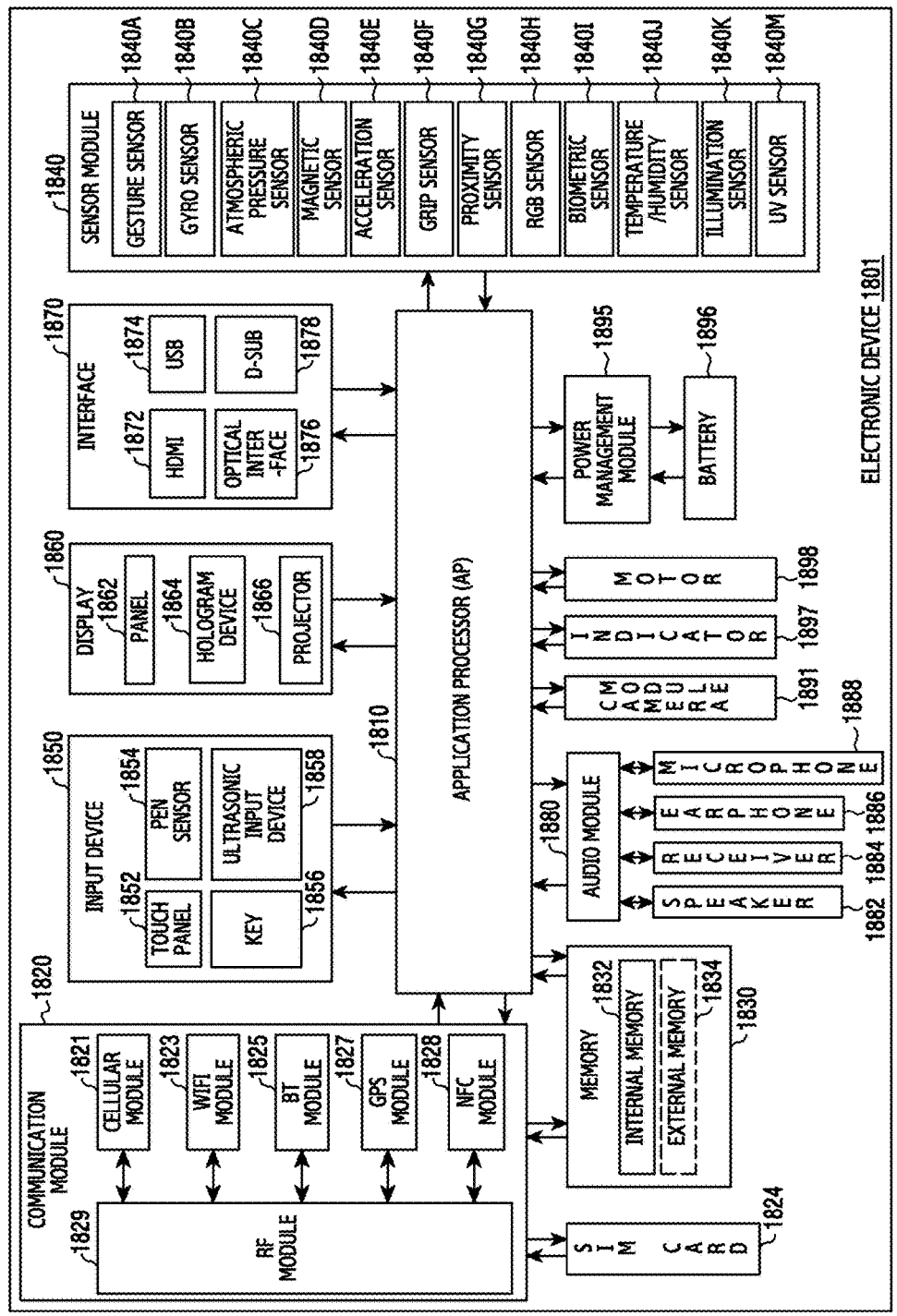
FIG. 18 is a block diagram of an electronic device according to various embodiments.

FIG. 18 is a block diagram of an electronic device according to various embodiments of the present disclosure. The electronic device 1801 may configure, for example, all or a portion of the electronic device 101 illustrated in FIG. 1.

Referring to FIG. 18, the electronic device 1801 may include one or more application processors (AP) 1810, a communication module 1820, a subscriber identification module (SIM) card 1824, a memory 1830, a sensor module 1840, an input device 1850, a display 1860, an interface 1870, an audio module 1880, a camera module 1891, a power management module 1895, a battery 1896, an indicator 1897, or a motor 1898.

The AP 1810 may drive an OS or an application to control a plurality of hardware or software elements connected to the AP 1810, and perform various data processes including multimedia data and operations. The AP 1810 may be implemented, for example, as a system on chip (SoC). According to an embodiment, the AP 1810 may further include a graphic processing unit (GPU) (not shown).

The communication module 1820 (e.g., the communication interface 160) may perform data transmission/reception in communication between the electronic device 1801 (e.g., the electronic device 101) and other electronic devices (e.g., the electronic device 104 or the server 106) connected via a network. According to an embodiment, the communication module 1820 may include a cellular module 1821, a Wi-Fi module 1823, a BT module 1825, a GPS module 1827, an NFC module 1828, and a Radio Frequency (RF) module 1829.

The cellular module 1821 may provide voice communication, image communication, a short message service, or an Internet service, etc. via a communication network (e.g., LTE, LTE-A, CDMA, WCDMA, UMTS, WiBro, or GSM, etc.). Also, the cellular module 1821 may perform discrimination and authentication of an electronic device within a communication network using, for example, a subscriber identify module (e.g., the SIM card 1824). According to an embodiment, the cellular module 1821 may perform at least a portion of functions that may be provided by the AP 1810. For example, the cellular module 1821 may perform at least a portion of a multimedia control function.

According to an embodiment, the cellular module 1821 may include a communication processor (CP). Also, the cellular module 1821 may be, for example, implemented as a SoC. Though elements such as the cellular module 1821 (e.g., a communication processor), the memory 1830, or the power management module 1895, etc. are illustrated as elements separated from the AP 1810 in FIG. 18, according to an embodiment, the AP 1810 may be implemented to include at least a portion (e.g., the cellular module 1821) of the above-described elements.

According to an embodiment, the AP 1810 or the cellular module 1821 (e.g., a communication processor) may load an instruction or data received from at least one of a non-volatile memory and other elements connected thereto onto a volatile memory, and process the same. Also, the AP 1810 or the cellular module 1821 may store data received from at least one of other elements or generated by at least one of other elements in a non-volatile memory.

Each of the Wi-Fi module 1823, the BT module 1825, the GPS module 1827, or the NFC module 1828 may include, for example, a processor for processing data transmitted/received via a relevant module. Though the cellular module 1821, the Wi-Fi module 1823, the BT module 1825, the GPS module 1827, or the NFC module 1828 are illustrated as separate blocks in FIG. 18, according to an embodiment, at least a portion (e.g., two or more elements) of the cellular module 1821, the Wi-Fi module 1823, the BT module 1825, the GPS module 1827, or the NFC module 1828 may be included in one Integrated Circuit (IC) or an IC package. For example, at least a portion (e.g., a CP corresponding to the cellular module 1821 and a Wi-Fi processor corresponding to the Wi-Fi module 1823) of processors corresponding to each of the cellular module 1821, the Wi-Fi module 1823, the BT module 1825, the GPS module 1827, or the NFC module 1828 may be implemented as one SoC.

The RF module 1829 may perform transmission/reception of data, for example, transmission/reception of an RF signal. The RF module 1829 may include, for example, a transceiver, a power amp module (PAM), a frequency filter, or a low noise amplifier (LNA), etc., though not shown. Also, the RF module 1829 may further include a part for transmitting/receiving an electromagnetic wave on a free space in wireless communication, for example, a conductor or a conducting line, etc. Though FIG. 18 illustrates the cellular module 1821, the Wi-Fi module 1823, the BT module 1825, the GPS module 1827, and the NFC module 1828 share one RF module 1829, according to an embodiment, at least one of the cellular module 1821, the Wi-Fi module 1823, the BT module 1825, the GPS module 1827, or the NFC module 1828 may perform transmission/reception of an RF signal via a separate RF module.

The SIM card 1824 may be a card including a subscriber identify module, and may be inserted into a slot formed in a specific position of the electronic device. The SIM card 1824 may include unique identify information (e.g., integrated circuit card identifier (ICCID)) or subscriber information (e.g., international mobile subscriber identity (IMSI)).

The memory 1830 (e.g., the memory 180) may include a built-in memory 1832 or an external memory 1834. The built-in memory 1832 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 1832 may be a Solid State Drive (SSD). The external memory 1834 may further include a flash drive, for example, compact flash (CF), secure digital (SD), micro secure digital (Micro-SD), mini secure digital (Mini-SD), extreme digital (xD), or a memory stick. The external memory 1834 may be functionally connected with the electronic device 1801 via various interfaces. According to an embodiment, the electronic device 1801 may further include a storage device (or a storage medium) such as a hard drive.

The sensor module 1840 may measure a physical quantity or detect an operation state of the electronic device 1801, and convert the measured or detected information to an electric signal. The sensor module 1840 may include, for example, at least one of a gesture sensor 1840A, a gyro sensor 1840B, an atmospheric pressure sensor 1840C, a magnetic sensor 1840D, an acceleration sensor 1840E, a grip sensor 1840F, a proximity sensor 1840G, a color sensor 1840H (e.g., RGB (red, green, blue) sensor), a living body sensor 1840I (e.g., a biometric sensor), a temperature/humidity sensor 1840J, an illuminance sensor 1840K, or an ultra violet (UV) sensor 1840M. Additionally or alternatively, the sensor module 1840 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 1840 may further include a control circuit for controlling at least one sensor belonging thereto.

The input device 1850 may include a touch panel 1852, a (digital) pen sensor 1854, a key 1856, or an ultrasonic input unit 1858. The touch panel 1852 may recognize a touch input using at least one of capacitive, resistive, infrared, or ultrasonic methods. Also, the touch panel 1852 may further include a control circuit. A capacitive touch panel may perform detection by a physical contact or proximity recognition. The touch panel 1852 may further include a tactile layer. In this case, the touch panel 1852 may provide a tactile reaction to a user.

The (digital) pen sensor 1854 may be implemented using, for example, a method which is the same as or similar to receiving a user's touch input, or using a separate sheet for detection. The key 1856 may include, for example, a physical button, an optical key or a keypad. The ultrasonic input unit 1858 is a unit for recognizing data by detecting a sound wave using a microphone (e.g., a microphone 1888) in the electronic device 1801 via an input tool generating an ultrasonic signal, and enables wireless recognition. According to an embodiment, the electronic device 1801 may receive a user input from an external device (e.g., a computer or a server) connected to the communication module 1820 using the communication module 1820.

The display 1860 (e.g., the display 150) may include a panel 1862, a hologram device 1864, or a projector 1866. The panel 1862 may be, for example, a liquid crystal display (LCD), or an active-matrix organic light-emitting diode (AM-OLED), etc. The panel 1862 may be implemented, for example, such that it is flexible, transparent, or wearable. The panel 1862 may be configured as one module together with the touch panel 1852. The hologram device 1864 may show a three-dimensional image in the air using interferences of light. The projector 1866 may project light onto a screen to display an image. The screen may be positioned, for example, inside or outside the electronic device 1801. According to an embodiment, the display 1860 may further include a control circuit for controlling the panel 1862, the hologram device 1864, or the projector 1866.

The interface 1870 may include, for example, a high-definition multimedia interface (HDMI) 1872, a USB 1874, an optical interface 1876, or a D-subminiature (D-sub) 1878. The interface 1870 may be included, for example, in the communication interface 160 illustrated in FIG. 1. Additionally or alternatively, the interface 1870 may include, for example, a mobile high-definition link (MHL) interface, a SD card/multi-media card (MMC) interface, or an infrared data association (IrDA) standard interface.

The audio module 1880 may convert a sound and an electric signal in dual directions. At least a partial element of the audio module 1880 may be included, for example, in the I/O interface 140 illustrated in FIG. 1. The audio module 1880 may process sound information input or output via, for example, a speaker 1882, a receiver 1884, an earphone 1886, or the microphone 1888, etc.

The camera module 1891 is a device that may shoot a still image and a moving picture. According to an embodiment, the camera module 1891 may include one or more image sensors (e.g., a front sensor or a rear sensor), a lens (not shown), an image signal processor (ISP) (not shown), or a flash (not shown) (e.g., an LED or xenon lamp).

The power management module 1895 may manage power of the electronic device 1801. Though not shown, the power management module 1895 may include, for example, a power management integrated circuit (PMIC), a charger IC, or a battery or a battery or fuel gauge.

The PMIC may be mounted, for example, inside an IC or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 1896, a voltage, a current, or a temperature while charging. The battery 1896 may store or generate electricity, and supply power to the electronic device 1801 using the stored or generated electricity. The battery 1896 may include, for example, a rechargeable battery or a solar battery.

The indicator 1897 may display a specific state of the electronic device 1801 or a portion thereof (e.g., the AP 1810), for example, a booting state, a message state, or a charging state, etc. The motor 1898 may convert an electric signal to mechanical vibration. Though not shown, the electronic device 1801 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

Each of the above-described elements of the electronic device according to the present disclosure may be configured using one or more components, and a name of a relevant element may change depending on a kind of the electronic device. An electronic device according to the present disclosure may include at least one of the above-described elements, and a portion of the elements may be omitted, or additional other elements may be further included. Also, a portion of the elements of the electronic device according to the present disclosure may combine to form one entity and equally perform a function of the relevant elements before the combination.

The terminology "module" used for the present disclosure may mean, for example, a unit including a combination of one or two or more among a hardware, a software, or a firmware. A "module" may be interchangeably used with a terminology such as a unit, a logic, a logical block, a component, or a circuit, etc. A "module" may be a minimum unit of an integrally configured part or a portion thereof. A "module" may be a minimum unit performing one or more functions or a portion thereof. A "module" may be mechanically or electronically implemented. For example, a "module" according to the present disclosure may include at least one of an application-specific integrated circuit (ASIC) chip, a field-programmable gate arrays (FPGAs), or a programmable-logic device which are known, or to be developed in the future, and performing certain operations.

According to various embodiments, at least a portion of an apparatus (e.g., modules or functions thereof) or a method (e.g., operations) according to the present disclosure may be implemented as an instruction stored in a computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (e.g., a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

According to various embodiments, a storage medium storing instructions is provided. The instructions, when executed by at least one processor, are set to allow the at least one processor to perform at least one operation. The at least one operation may include outputting a first application execution screen in a first reproduction area in response to an application execution request, outputting a second reproduction area for generating a command related to recording data generation in at least a part of the first reproduction area, outputting a second application execution screen in the second reproduction area, and generating recording data in response to an input for the second reproduction area.

A method and an apparatus for generating data by an electronic device according to various embodiments of the present disclosure may use a data reproduction screen as a data generation menu to prevent some of the screen composition from being hidden by the data generation menu, thereby improving data generation performance.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
  a memory;
  a touch screen; and
  at least one processor configured to:
    control the touch screen to display an execution image of an application on a first area of the touch screen,
    control the touch screen to display an image obtained from a camera or other electronic device on a second area floating in at least part of the first area, the second area providing a function related to generating recording data,
    detect a user input on the second area,
    in response to the detecting of the user input, generate first recording data corresponding to the execution image of the application displayed on the first area and second recording data corresponding to the image displayed on the second area, generate video data by combining the first recording data and the second recording data, and store the video data in the memory.

2. The electronic device of claim 1, wherein the at least one processor is further configured to control the touch screen to stop a display function for at least one of the first area and the second area in response to the user input on one of the first area or the second area.

3. The electronic device of claim 1, wherein the at least one processor is further configured to control the touch screen to change a shape of at least one of the first area and the second area in response to the user input on one of the first area and the second area.

4. The electronic device of claim 1, wherein the at least one processor is further configured to define a shape of at least one of the first area and second area according to each application.

5. The electronic device of claim 1, wherein the at least one processor is further configured to record one or more images displayed in the first area and the second area in a form of layers.

6. The electronic device of claim 1, wherein the at least one processor is further configured to record one or more images displayed in the first area and the second area in a recording scheme corresponding to the user input.

7. The electronic device of claim 1, wherein the at least one processor is further configured to:

control the touch screen to display a list of recording data generated by the recording operation, determine recording data based on a user input, and display images on the first area and the second area based on the determined recording data.

8. A method of operating an electronic device, the method comprising:

displaying an execution image of an application on a first area of a touch screen;

displaying an image obtained from a camera or other electronic device on a second area floating in at least part of the first area, the second area providing a function realted to generate recording data;

detecting a user input on the second area;

in response to the detecting of the user input, generating first recording data corresponding to the execution image of the application displayed on the first area and second recording data corresponding to the image displayed on the second area;

generating video data by combining the first recording data and the second recording data; and storing the video data in a memory.

9. The method of claim 8, further comprising at least one of:

changing a shape of at least one of the first area and the second area based on the user input on one of the first area and the second area;

stopping a display function for at least one of the first area and outputting of the second area based on the user input on one of the first area and the second area;

determining a position of the second area; and determining a storage scheme for recording data by the recording operation.

10. The method of claim 8, further comprising displaying information related to the recording operation in at least one of the first area and second area.

11. The method of claim 8, wherein the generating of the first recording data and the second recording data comprises recording one or more images displayed in the first area and the second area in a form of layers.

12. The method of claim 8, further comprising:

displaying a list of recording data generated by the recording operation;

determining recording data based on a user input; and displaying images on the first area and the second area based on the determined recording data.

13. The method of claim 12, wherein the displaying of the images on the first area and the second area comprises changing and reproducing a layer configuration of at least one image stored in a form of layers.

14. A non-transitory computer-readable recording medium having a program recorded therein to execute a process, the process comprising:

displaying an execution image of an application on a first area of a touch screen;

displaying an image obtained from a camera or other electronic device on a second area floating in at least part of the first area, the second area providing a function related to generating recording data;

detecting a user input on the second area;

in response to the detecting of the user input, generating first recording data corresponding to the execution image of the application displayed on the first area and second recording data corresponding to the image displayed on the second area;

generating video data by combining the first recording data and the second recording data; and storing the video data in a memory.

* * * * *